United States Patent
Zhang et al.

(10) Patent No.: US 8,077,259 B2
(45) Date of Patent: Dec. 13, 2011

(54) VIDEO SIGNAL CONVERTER, VIDEO DISPLAY DEVICE, AND VIDEO SIGNAL CONVERTING METHOD

(75) Inventors: Xiaomang Zhang, Kameyama (JP); Naoko Kondoh, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 646 days.

(21) Appl. No.: 12/262,957

(22) Filed: Oct. 31, 2008

(65) Prior Publication Data

US 2009/0141167 A1 Jun. 4, 2009

Related U.S. Application Data

(60) Provisional application No. 60/996,092, filed on Nov. 1, 2007.

(30) Foreign Application Priority Data

Oct. 31, 2007 (JP) ................................. 2007-283025
Sep. 30, 2008 (JP) ................................. 2008-252253

(51) Int. Cl.
*H04N 11/22* (2006.01)
(52) U.S. Cl. ........ 348/455; 348/582; 348/624; 345/589; 345/590; 345/591; 345/600; 345/601; 345/602; 345/603; 345/604; 345/605; 382/162; 382/166; 382/167
(58) Field of Classification Search .................. 348/455, 348/582, 624; 345/589, 590, 591, 600, 601, 345/602, 603, 604, 605
See application file for complete search history.

(56) References Cited

U.S. PATENT DOCUMENTS

| | | | |
|---|---|---|---|
| 5,691,779 A * | 11/1997 | Yamashita et al. ............ | 348/645 |
| 5,933,253 A | 8/1999 | Ito et al. | |
| 6,069,671 A * | 5/2000 | Lee et al. ...................... | 348/659 |
| 7,019,756 B2 * | 3/2006 | Park et al. ...................... | 345/589 |
| 2002/0041393 A1 | 4/2002 | Takahashi et al. | |
| 2005/0226526 A1* | 10/2005 | Mitsunaga .................... | 382/274 |
| 2006/0262224 A1* | 11/2006 | Ha et al. ....................... | 348/582 |

FOREIGN PATENT DOCUMENTS

| | | |
|---|---|---|
| JP | 9-098298 A | 4/1997 |
| JP | 2002-118764 | 4/2002 |
| RU | 2199827 C2 | 2/2003 |

* cited by examiner

*Primary Examiner* — Jefferey Harold
*Assistant Examiner* — Mustafizur Rahman
(74) *Attorney, Agent, or Firm* — Birch, Stewart, Kolasch & Birch, LLP

(57) ABSTRACT

When each value of luminance signals of three primary colors in the primary video signal is less than the output lower limit value, in short, when the gradation level is negative, the negative gradation level of the present primary color is, in accordance with its magnitude, in other words, in accordance with the absolute value of the negative gradation level, replaced with positive gradation levels of other two primary colors. Therefore, in accordance with A VIDEO SIGNAL CONVERTER of this invention, even when the primary video signal includes a signal value having a negative gradation level, in short, even when one or more of each signal value of RGB is below the output lower limit value, a color according to the combination of those gradation levels (a combination of each level of primary colors (RGB)) can be reproduced (displayed) by a display means.

16 Claims, 4 Drawing Sheets

VIDEO SIGNAL CONVERTER, VIDEO DISPLAY DEVICE, AND VIDEO SIGNAL CONVERTING METHOD

BACKGROUND OF THE INVENTION

1. Field of the Invention

The present invention relates to a video signal converter and a method for converting a video signal composed of luminance signals of each primary color (RGB) which may have a signal value within an extended range partially including a prescribed output range into a video signal composed of luminance signals of each primary color (RGB) which may have a value within the output range, as well as to a video display device comprising the video signal converter. In addition, the extended range is what the output range is extended, and is wider than the output range.

2. Description of the Related Art

In a video display device such as a television receiver, a video display member such as a liquid crystal display displays a video based on a video signal (hereinafter referred to as "output side video signal") composed of luminance signals of each primary color (RGB). Generally, in regard to a luminance signal of primary colors (RGB) in the output side video signals, its signal value, in short, a value of a luminance signal of each Red, Green, and Blue is normalized within an output range (for example, such as 0 to 255 or 0 to 1) from a predetermined lower limit value (hereinafter referred to as "output lower limit value") to an upper limit value greater than the lower limit value (hereinafter referred to as "output upper limit value"). Here, a color, which is expressed by a combination of values of luminance signals of primary colors (RGB) within the output range, is the color in a color gamut displayable by a video display member. In addition, the color gamut displayable, that is, reproducible by the video display member is referred to as a color reproduction region or a color reproduction range of the video display member. Additionally, in the present Description, the words "displayable" and "reproducible" mean the same.

When a color gamut possible to be expressed by an input side video signal agrees with a color gamut possible to be reproduced by a video display member, the input side video signal as it is may be employed as the output side video signal. This allows a video of a color corresponding to the input side video signal to be displayed on the video display member. Additionally, the input side video signal is a video signal to be input into a video display device (hereinafter referred to as "input video signal"), or a video signal obtained by subjecting the input video signal to a known color gamut converting processing.

On the other hand, like the case where a color gamut possible to be expressed by an input side video signal is wider than a color gamut of the video display member, when a color gamut possible to be expressed by the input side video signal is outside of a color gamut possible to be reproduced by a video display member, the signal value of the input side video signal may obtain a value outside of the output range. The input side video signal as it is cannot therefore be employed as the output side video signal.

For example, there is a case where a luminance value range of three primary colors in the video signal corresponding to the color gamut of a video display member, in short, the output range is 0 to 1, whereas a signal value of the input side video signal may be negative or more than 1. In such a case, it is necessary to convert the input side video signal into the output side video signal composed of signal values within the output range. As a state requiring such conversion, for example, the input side video signal is a video signal complying to the standard IEC 61966-2-4 (commonly known as "xvYCC standard") and IEC 61966-2-1, whereas the output side video signal may be a video signal complying to the standard ITU-R BT.709.

Here, as a signal converting method when a signal value of the input side video signal is outside of the output range, the output side video signal may be converted by clipping a signal value of the input side video signal in the output range. The clipping processing is an easiest signal conversion method and also referred to as "limiter processing".

In addition, the Patent Document: Japanese Unexamined Patent Publication No. H09-98298 discloses an art in that, when a color gamut of the output system is narrower than that of the input system, the color gamut of the input system is region-divided on a two-dimensional plane of lightness and saturation, and then the compression of the color gamut, in short, the compression of the signal value is conducted, while setting the color phase constant in each divided region. Additionally, the color gamut of the output system corresponds to a color gamut of a video display member, while the color gamut of the input system corresponds to a color gamut of the input side video signal.

However, to convert the input side video signal into the output side video signal by the clipping processing has a problem as below. That is, since all signal values of the input side video signal that exceed the output range are replaced with the output lower limit value or the output upper limit value, the color continuity in the input side video signal is seriously impaired, in short, a gradation failure occurs.

On the other hand, as can be seen from the Patent Document, to convert the input side video signal into the output side video signal by the color gamut compression has a problem as below. That is, even when the input side video signal expresses a color within the color gamut of the video display member, in short, even when a signal value of the input side video signal is within the output range, the video signal might be converted into a video signal of a different color, though the color continuity may be ensured. This causes a problem in that an original color the input video signal ought to express cannot be reproduced (displayed) accurately. Moreover, in the processing shown in the Patent Document, a video signal is processed as data on the two-dimensional plane of lightness and saturation. The processing shown in the Patent Document for conducting the color gamut compression as keeping the color phase constant therefore becomes an arithmetic processing using a trigonometric function, thereby involving a high arithmetic load.

Consequently, the present invention has been completed on the basis of the above circumstances, with an object of providing a video signal converter, a video signal converting method, and a video display device which are possible to accurately reproduce (express) an original color a given video signal ought to express, when a color gamut of the given video signal corresponding to the input side video signal does not agree with a color gamut displayable by a video display member, and thus the video signal is converted into a video signal expressing a color within the color gamut of the video display member, and when the given video signal expresses a color within the color gamut of a video display member, and furthermore, possible to ensure the color continuity, in short, possible to prevent a gradation failure when the given video signal expresses a color in the region outside of the color gamut of the video display member, while at the same time, possible to perform a signal conversion processing at a low arithmetic load.

SUMMARY OF THE INVENTION

A video signal converter according to the present invention is a device for converting a video signal (hereinafter referred to as "primary video signal") composed of luminance signals of each primary color (RGB) that may obtain a signal value within an extended range partially including an output range from a predetermined output lower limit value to an output upper limit value, into a secondary video signal. The secondary video signal is a video signal to be input into a prescribed video display means, and composed of luminance signals of each primary color (RGB) that may obtain a value within the output range. And also, a video signal converter according to a first aspect of the present invention comprises each component shown in the following (1-1) and (1-2).
(1-1) an interim luminance value calculating means for calculating interim luminance values of each primary color (RGB) that are obtained by applying values of luminance signals of each primary color (RGB) in the primary video signal to the following formulas (A1) and (A2).

$$\left.\begin{array}{l}\text{If } Xr < S\min \text{ Then } c = S\min - Xr, \ Xr' = S\min \quad \text{Else } c = 0, \ Xr' = Xr \\ \text{If } Xg < S\min \text{ Then } m = S\min - Xg, \ Xg' = S\min \quad \text{Else } m = 0, \ Xg' = Xg \\ \text{If } Xb < S\min \text{ Then } y = S\min - Xb, \ Xb' = S\min \quad \text{Else } y = 0, \ Xb' = Xb \end{array}\right\} \quad (A1)$$

$$\left.\begin{array}{l}Lr = Xr' + k \cdot y + k \cdot m \\ Lg = Xg' + k \cdot c + k \cdot y \\ Lb = Xb' + k \cdot m + k \cdot c \end{array}\right\} \quad (A2)$$

However, Smin is the output lower limit value (a lower limit value of each luminance signal in a secondary video signal); Xr, Xg and Xb are respectively a value of a luminance signal (R), a value of a luminance signal (G), and a value of a luminance signal (B) in the primary video signal; c, m, y, Xr', Xg', and Xb' are variables; k is an invariable (0<k); and Lr, Lg, and Lb are respectively a R interim luminance value, a G interim luminance value, and a B interim luminance value.

(1-2) a secondary video signal producing means for producing the secondary video signal composed of signals of values within the output range converted from the interim luminance values of each of the primary colors (RGB) in accordance with a predetermined conversion rule, when the interim luminance values of each primary color (RGB) include a value greater than the output upper limit value; the secondary video signal composed of signals of interim luminance values of each primary color (RGB), when the interim luminance values of each of the primary colors (RGB) do not include a value greater than the output upper limit value.

Here, when the secondary video signal is a video signal composed of luminance signals of each primary color (RGB) that may obtain a signal value within the output range as a normalized value range from 0 to 1, the primary video signal is a video signal composed of luminance signals of each primary color (RGB) that may obtain a signal value within the extended range as a range of normalized value from a negative value to a value greater than 1. In this case, the formula (A1) can be replaced with the next formula (A1'), since the output lower limit value and the output upper limit value are respectively 0 and 1. The formula (A1') is one example of the formula (A1).

$$\left.\begin{array}{l}\text{If } Xr < 0 \text{ Then } c = -Xr, \ Xr' = 0 \quad \text{Else } c = 0, \ Xr' = Xr \\ \text{If } Xg < 0 \text{ Then } m = -Xg, \ Xg' = 0 \quad \text{Else } m = 0, \ Xg' = Xg \\ \text{If } Xb < 0 \text{ Then } y = -Xb, \ Xb' = 0 \quad \text{Else } y = 0, \ Xb' = Xb \end{array}\right\} \quad (A1')$$

In addition, the present invention does not necessarily require the calculation of the interim luminance values of each primary color (RGB) in accordance with formulas (A1) and (A2), and the calculation of the interim luminance values of each primary color (RGB) may be conducted by performing a processing capable of obtaining a result equivalent to the one of a processing in accordance with formulas (A1) and (A2). For example, the calculation of the interim luminance values of each primary color (RGB) may be achieved by executing a signal value calculation processing based on other arithmetic expressions capable of obtaining a result equivalent to the one of a signal value calculation processing in accordance with the formulas (A1) and (A2), or a signal conversion processing based on a prescribed signal value table.

And also, the primary video signal is a signal after the color gamut conversion, so as to respond to a color gamut displayable by the video display means, in short, to respond to a reproducible color gamut. Consequently, when a signal value of the primary video signal is within the output range, an original color the primary video signal ought to express is accurately reproduced by the video display means if the primary video signal is used as the secondary video signal as it is.

Also, as the predetermined conversion rule for the secondary video signal producing means, for example, a rule in any of the following (3) or (4) may be employed.
(3) To replace the largest value in the interim luminance values with the output upper limit value, and at the same time, compressing other interim luminance values based on a compression coefficient determined in accordance with the largest value in the interim luminance values.
(4) To compress all of the interim luminance values of each primary color (RGB) according to the ratio between the width of the range from the output lower limit value to the largest value in the interim luminance values of each primary color (RGB) and the width of the output range.

In what follows, a conversion processing of a video signal according to the present invention is described. In the following description, "gradation level" is a value obtained by subtracting the output lower limit value (Smin) from a luminance signal value (signal values Xr, Xg, and Xb) of each primary color (RGB). And also, when the output lower limit value is 0 (Smin=0), a signal value (luminance value) and a gradation level of each primary color (RGB) are the same value.

In the present invention, when signal values (Xr, Xg, and Xb) in the primary video signal are within the output range, the primary video signal becomes the secondary video signal as it is. In short, in the formulas (A1) and (A2), the interim luminance values are Lr=Xr, Lg=Xg, and Lb=Xg, and these values as they are become luminance signal values of primary colors (RGB) in the secondary video signal.

In addition, according to the present invention, when the gradation level of a primary color in the primary video signal is a negative level, in short, when the signal values Xr, Xg, and Xb are less than the output lower limit value Smin, the gradation level (a negative level) is replaced with positive gradation levels of other two primary colors having a level according to its magnitude (absolute value). For example, when the output range is 0 to 1, and when a value of the R luminance signal in the primary video signal is −0.1, the middle luminance calculation means replaces the negative gradation level (−0.1−0=−0.1) of the R luminance signal with the positive gradation levels (kc: however, c=0−(−0.1), k is a positive invariable) of two primary colors (G and B) according to its magnitude. This means that the negative gradation level (−c) of a primary color R is replaced with a positive gradation level (c) of cyan as a complementary color of the primary color R, and further, the positive gradation level (c) of the cyan is converted into positive gradation levels (kc) of each of other two primary colors (G and B) by means of an additive color mixture.

Additionally, in the present invention, when all the middle signal values of each primary color (RGB) are equal to or less than the output upper limit value, these values as they are become the signal values of the secondary video signal. The middle signal values in this case are equivalent to the values of the secondary video signal. Therefore, the term "the interim luminance value" possibly mean a signal value calculated in the process of signal conversion from the primary video signal into the secondary video signal, however, when all the middle signal values of each primary color (RGB) are equal to or less than the output upper limit value, the term "interim luminance value" is replaceable with "signal value of the secondary video signal".

As described in the above, according to the present invention, when signal values (Xr, Xg, and Xb) in the primary video signal are within the output range, the primary video signal becomes the secondary video signal as it is, and thus, an original color the primary video signal ought to express can be accurately reproduced (expressed) by the video display means.

And also, according to the present invention, when each value of luminance signals of three primary colors in the primary video signal is less than the output lower limit value, in short, when the gradation level is negative, the negative gradation level of the present primary color is, in accordance with its magnitude, in other words, in accordance with the absolute value of the negative gradation level, replaced with positive gradation levels of other two primary colors. According to the present invention, therefore, even when the primary video signal includes a signal value having a negative gradation level, in short, even when one or more of each signal value of RGB is below the output lower limit value, a color according to the combination of those gradation levels (a combination of each level of primary colors (RGB)) can be reproduced (displayed) by a display means. Furthermore, in such case, unless the interim luminance value surpasses the output upper limit value, the color continuity in a region outside of the color gamut of the video display means can be ensured. Additionally, to be capable of ensuring the color continuity means to be capable of preventing a gradation failure. Moreover, the conversion processing of video signals according to the present invention can be realized by simple four arithmetic operations, in short, a simple low load arithmetic operation, based on signal values of each primary color (RGB).

However, there rarely occurs a situation where, regarding each signal of three primary colors, the interim luminance values Lr, Lg, and Lb of each primary color (RGB), obtained by replacing a negative gradation level with positive gradation levels of signals of other two primary colors, may surpass the output upper limit value. In such case, the interim luminance value may be compressed to produce the secondary video signal in accordance with the rules in (3) and (4). Doing so ensures, in the region outside of the color gamut of the video display means, the color continuity in the region outside of the color gamut of the video display means. In short, a gradation failure can be prevented.

Particularly, when the secondary video signal is produced by compressing the interim luminance value in accordance with the rule in (4), the color balance, in short, the color phase between three primary colors in the interim luminance value can be maintained also in the secondary video signal.

Also, when an invariable k is 1 in the formula (A2), as described later, the color phase of a color the primary video signal expresses and the color phase of a color the interim luminance value expresses can match. Furthermore in such case, when an original color the primary video signal expresses is a color outside of the color gamut of the video display means, a color approximately-same as the original color can be reproduced by the video display means.

In the invention described above, when the luminance signals of three primary colors in the primary video signal include two or more signals smaller than the output lower limit value, the negative gradation levels of each of these two or more primary colors are replaced with positive gradation levels of other two primary colors according to its magnitude. In addition, that a luminance signal value is smaller than the output lower limit value means the gradation level is negative. And also, a magnitude of the gradation level means an absolute value of the level.

However, regarding only a minimum value among a plurality of values in the primary video signals smaller than the output lower limit value, in a phase when replacing processing for replacing a negative gradation level with positive gradation levels of other two primary colors was conducted, there may be no more primary color having a negative gradation level. In such case, with respect to a value other than the minimum value among a plurality of values in the primary video signal smaller than the output lower limit value, there is no need to make a point to perform replacing processing for replacing a negative gradation level with positive gradation levels of other two primary colors.

Also, in a phase when replacing processing for replacing a negative gradation level with positive gradation levels of other two primary colors was conducted only to the two smallest values among the three values in the primary video signal smaller than the output lower limit value, there may be no more primary color having a negative gradation level. Similarly, in such case, there is no need to perform replacing processing for replacing a negative gradation level with positive gradation levels of other two primary colors to all negative gradation levels of each three primary colors.

So, in response, a video signal converter according to a second aspect of the present invention comprises each component described in the following (2-1) and (2-2).

(2-1) an interim luminance value calculating means for calculating interim luminance values of each primary color (RGB), by conducting a first complementary color conversion processing for setting the output lower limit value to a signal value of a primary color having a primary signal minimum value when the primary signal minimum value as a minimum value among the luminance signal values of each primary color (RGB) in the primary video signal is less than the output lower limit value, and at the same time, for setting a value obtained by adding a positive complementary value proportional to a difference between the output lower limit value and the primary signal minimum value to signal values of two primary colors other than the primary signal minimum value in the primary video signal.

(2-2) a secondary video signal producing means for producing the secondary video signal composed of signals of values obtained by converting the interim luminance values of each of the primary colors (RGB) into values within the output range in accordance with a predetermined conversion rule, when the interim luminance values of each of the primary colors (RGB) includes a value greater than the output upper limit value; the secondary video signal composed of signals of interim luminance values of each primary color (RGB), when the interim luminance values of each of the primary colors (RGB) do not include a value greater than the output upper limit value.

(2-2) is the same as (1-2) in a video signal converter according to the first aspect of the present invention.

Also, the interim luminance value calculating means may perform the processing described in the following (2-1a) or (2-1b).

(2-1a) the interim luminance value calculating means calculates the interim luminance values of each of the primary colors (RGB) by conducting, in addition to the first complementary color conversion processing, a second complementary color conversion processing as described below, when a first complementary color conversed signal's minimum value as a minimum value among the later-described first complementary color conversed signal values is less than the output lower limit value.

Additionally, the first complementary color conversed signal value is a signal value of each primary color (RGB) obtained by the first complementary color conversion processing.

In addition, the second complementary color conversion processing is for setting the output lower limit value to a signal value of a primary color having a first complementary color conversed signal value, and at the same time, for setting a value obtained by adding a positive complementary value proportional to a difference between the output lower limit value and the first after-complementary color conversion minimum signal value to signal values of two primary colors other than the first complementary color conversed signal's minimum value in the first complementary color conversed signal values.

(2-1b) the interim luminance value calculating means calculates the interim luminance values of each of the primary colors (RGB) by conducting, in addition to the first complementary color conversion processing and the second complementary color conversion processing, a third complementary color conversion processing as described below, when a second complementary color conversed signal's minimum value as a minimum value among the later-described second complementary color conversed signal values is less than the output lower limit value.

Additionally, the second complementary color conversed signal value is a signal value of each of the primary colors (RGB) obtained by the second complementary color conversion processing.

In addition, the third complementary color conversion processing is for setting the output lower limit value to a signal value of a primary color having the second complementary color conversed signal's minimum value, and at the same time, for setting a value obtained by adding a positive complementary value proportional to a difference between the output lower limit value and the second complementary color conversed signal's minimum value to signal values of two primary colors other than the second complementary color conversed signal's minimum value in the second complementary color conversed signal values.

A video signal converter according to the second aspect of the present invention can avoid an unnecessary increase of the interim luminance values of each of the primary colors (RGB). As a result, a change (increase) in luminance (brightness) of a video caused by the signal conversion from the primary video signal to the secondary video signal can be restrained to the minimum.

In addition, in a state where a video signal converter according to the second aspect of the present invention conducts the third complementary color conversion processing as shown in the above (2-1b), after all, the results obtained by a video signal converter according to the second aspect of the present invention and a video signal converter according to the first aspect of the present invention are the same.

As an example of the primary video signal, a video signal complying to the standard IEC 61966-2-4, or IEC 61966-2-1, as well as said video signal that was subjected to gamma processing may be considered. IEC stands for International Electrotechnical Commission. And the standard IEC 61966-2-4 is, so called, a new international standard for extended color space for motion picture: xvYCC.

On the other hand, as an example of the secondary video signal or the secondary video signal subjected to gamma processing, a video signal complying to the standard ITU-R BT.709 or ITU-R BT.601-5 may be considered. ITU stands for International Telecommunication Union.

In addition, the present invention can also be regarded as a video display device, comprising a video signal converter according to the present invention described above and a video display means for displaying a video based on the secondary video signal produced by the video signal converter.

And also, the present invention can also be regarded as a video signal converting method, in which the processing conducted by each means in a video signal converter in accordance with the present invention described above is conducted by a processor. Additionally, the processor may be, in other words, an arithmetic means or a computer.

According to the present invention, when signal values (Xr, Xg, and Xb) of the primary video signal are within the output range, the primary video signal becomes the secondary video signal as it is, and thus, an original color the primary video signal ought to express can be accurately reproduced (expressed) by the video display means. Additionally, 'within the output range' means within a range that a signal value of the secondary video signal to be input into a video display means can obtain.

And also, according to the present invention, when the primary video signal is a signal showing a color in a region outside of the color gamut of the video display means, and when at least the gradation level of the signal is negative, the color continuity in the region outside of the color gamut of the video display means can often be ensured. Additionally, to be capable of ensuring the color continuity means to be capable of preventing a gradation failure. Particularly, when a coefficient k (invariable) in the formula (A2) is 1, a color phase of the color expressed by the primary video signal (original video signal) and that of the color expressed by the secondary video signal can match each other. As a result, when an original color the primary video signal expresses is a color outside of the color gamut of the video display means, a color approximately-same as the original color can be reproduced by the video display means.

Moreover, the conversion processing of video signals according to the present invention can be realized by simple four arithmetic operations, in short, a simple low load arithmetic operation, based on signal values of each primary color (RGB), and thus, can be conducted by a relatively low-performance processor.

DETAILED DESCRIPTION OF THE PREFERRED EMBODIMENTS

In what follows, as referring now to accompanied figures, the embodiment of the present invention is explained to provide sufficient understanding of this invention. In addition, the embodiment in below is a mere example that materialized the present invention, and does not intend to limit the technical scope of the present invention.

Figure 1:
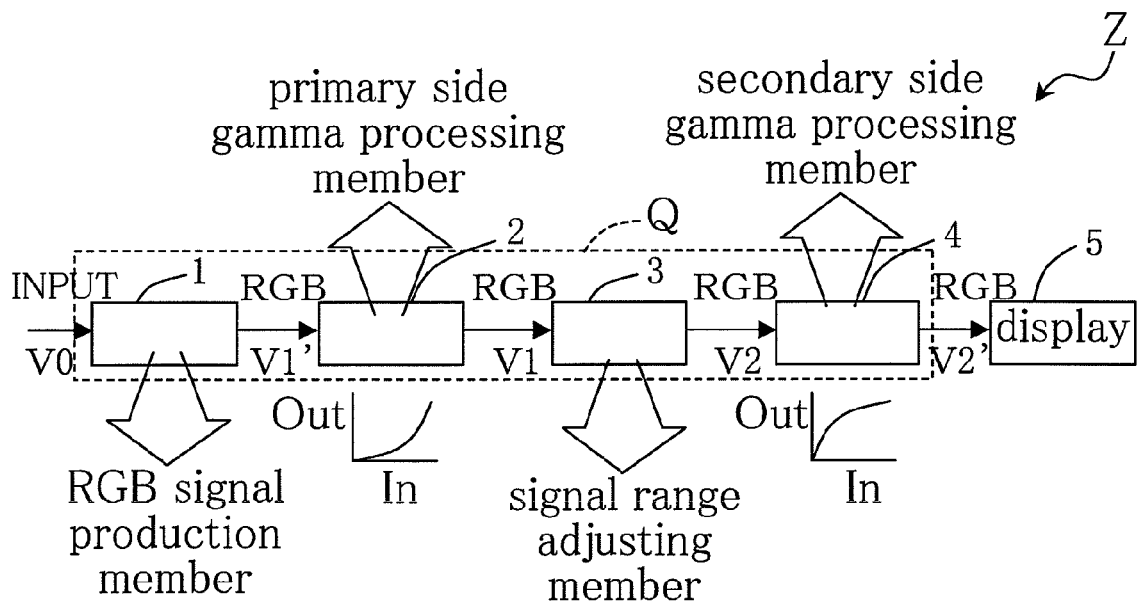
FIG. 1 is a block diagram showing a general configuration of a main part of a video display device Z according to an embodiment of the present invention.
Figure 2:
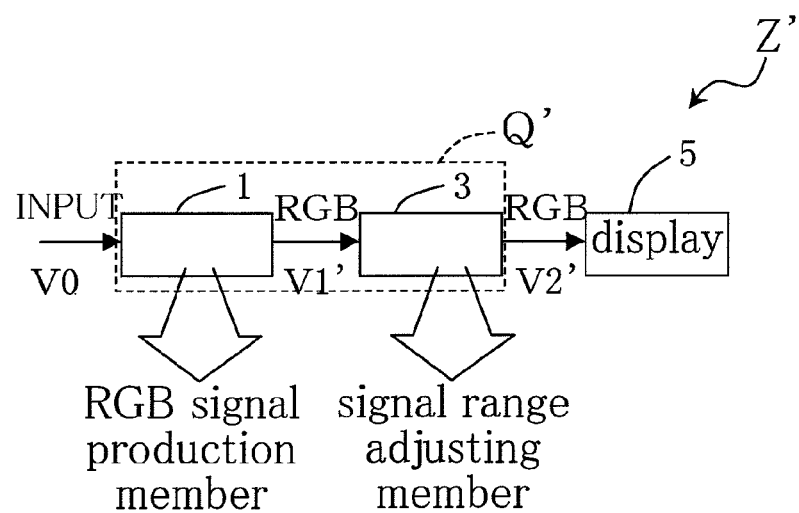
FIG. 2 is a view showing a general configuration of a main part of a video display device Z' as a variation of a video display device Z.
Figure 3:
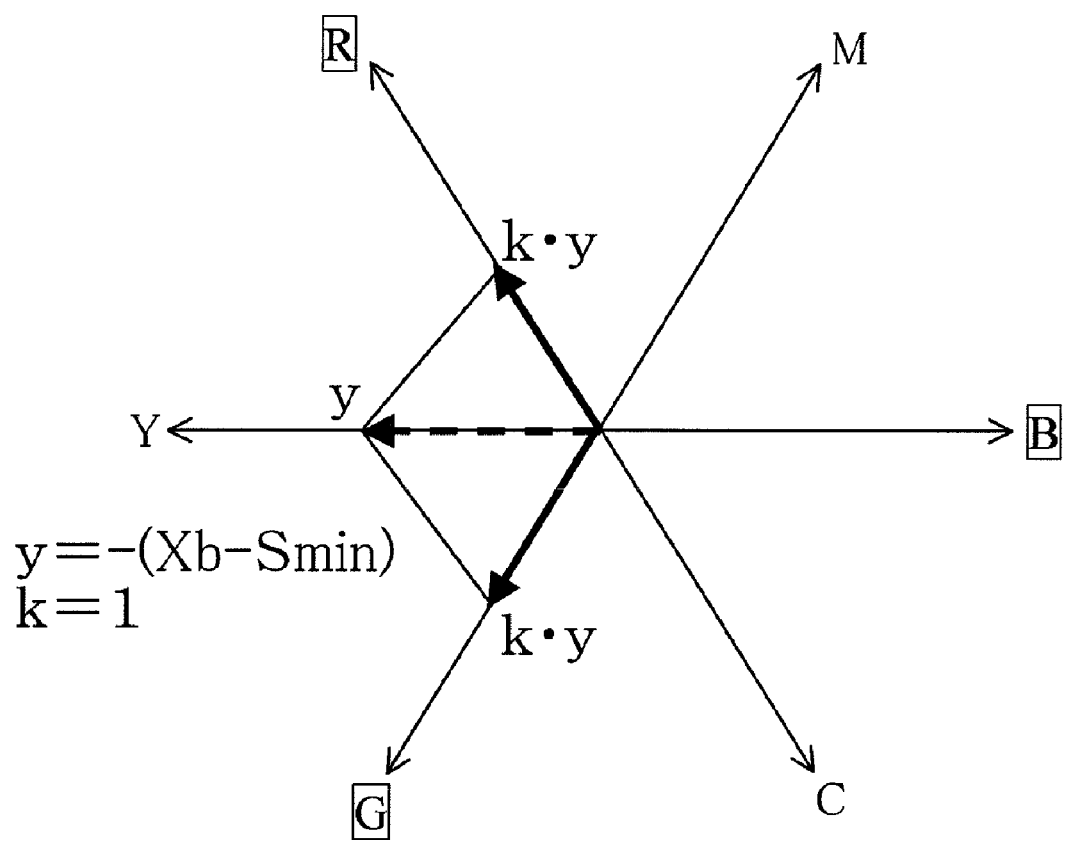
FIG. 3 is a conceptual diagram vectorially expressing that a signal range adjusting member of a video display device Z replaces a negative gradation level of a primary color B with positive gradation levels of other two primary colors.

Here, FIG. 1 is a block diagram showing a general configuration of a main part of a video display device Z according to an embodiment of the present invention; FIG. 2 is a view showing a general configuration of a main part of a video display device Z' as a variation of a video display device Z; FIG. 3 is a conceptual diagram vectorially expressing that a signal range adjusting member of a video display device Z replaces a negative gradation level of a primary color B with positive gradation levels of other two primary colors; and FIGS. 4 to 7 are views expressing in chromaticity diagrams concrete examples (first to fourth examples) of reproductive colors of video signals.

A video display device Z according to an embodiment of the present invention comprises, as illustrated in FIG. 1, a display 5 as a video display means and a video signal converter Q. The video signal converter Q is a converter for converting an input video signal into an RGB signal to be supplied to the display 5.

The display 5 is a device, such as a liquid crystal display or CRT, into which a video signal composed of luminance signals (R signal, G signal, and B signal) of each primary color (RGB) is input, and displays a video based on the input video signal. A video signal (RGB signal) to be input into the display 5 is a video signal composed of luminance signals of each primary color (RGB) that may obtain a value within a range (hereinafter referred to as "output range W") from a predetermined output lower limit value Smin to an output upper limit value Smax. This video signal is hereinafter referred to as "nonlinear secondary video signal V2'". In addition, Smin is smaller than Smax. Also, a video signal input into the display 5 is such as an RGB signal complying to, for example, the standards ITU-R BT.709 and ITU-R BT.601-5. In addition, the nonlinear secondary video signal V2' is a video signal obtained by normalizing the signal values (luminance signal value of each Red, Green, and Blue) within the output range W (for example, 0 to 255 or 0 to 1), so as to correspond to a color in a color gamut displayable on the display 5.

And a video signal expressible of a color gamut more extended than the color gamut displayable by the display 5 is input into the video display device Z. This video signal is hereinafter referred to as "input video signal V0".

The video signal converter Q conducts a processing for converting the input video signal V0 input from the outside into a nonlinear primary video signal V1' as a video signal composed of luminance signals of each RGB signal (the primary colors: RGB), and at the same time, furthermore, converting the nonlinear primary video signal V1' into a nonlinear secondary video signal V2' to be input into the display 5. Here, the nonlinear secondary video signal V2' is a video signal composed of luminance signals of each primary color (RGB) that may obtain values within the output range W.

In addition, the video signal converter Q is constituted by comprising: a recording means such as a ROM that is a digital processing circuit or a digital element such as, for example, DSP (Digital Signal Processor) and ASIC (Application Specific Integrated Circuit), in which an arithmetic processor and a program conducted by the processor are recorded, and a peripheral devices such as a RAM. An RGB signal producing member 1, a primary side gamma processing member 2, a signal range adjusting member 3 and a secondary side gamma processing member 4 as a respective component to be comprised in the video signal converter Q are realized by the processor, which conducts a program corresponding to each of the processing.

In addition, each component comprised in the video signal converter Q conducts delivery and receipt of a signal value, in a way that a post-stage component reads out and refers to a signal value recorded in a memory by a pre-stage component. A signal value to be recorded in a memory is a result of the signal processing conducted by each component.

Next, the processing of the RGB signal producing member 1, the primary side gamma processing member 2, the signal range adjusting member 3, and the secondary side gamma processing member 4 in the video signal converter Q are described.

The RGB signal producing member 1 conducts processing for converting the input video signal V0 input from the outside into the nonlinear primary video signal V1' as a video signal composed of luminance signals of each primary color (RGB). The conversion processing into the nonlinear primary video signal V1' is production processing of an RGB signal.

The input video signal V0 is a video signal such as a YUV signal or a Ycbcr signal complying to the standard IEC 61966-2-4 or IEC 61966-2-1, and its color gamut is more extended than the color gamut possible to be displayed (reproduced) on the display 5.

Since the color gamut expressible by the input video signal V0 is more extended than the color gamut of the display 5, in short, than the color gamut expressible by the input video signal V0, the nonlinear primary video signal V1' becomes an RGB signal that may obtain a signal value in the extended range W' partially including the output range W. Here, the output range W is from the output lower limit value Smin to the output upper limit value Smax. Also, the RGB signal is a video signal composed of luminance signals of each primary color (RGB).

Additionally, in the standards IEC 61966-2-4 and IEC 61966-2-1, a conversion rule, in other words, a conversion formula for converting a YUV signal and a Ycbcr signal complying to each standard into an RGB signal complying to the same standard is prescribed. The RGB signal producing member 1 conducts a signal conversion processing in conformity to the rule. Therefore, when the input video signal V0 is a video signal such as a YUV signal and a Ycbcr signal complying to the standard IEC 61966-2-4 or IEC 61966-2-1, the nonlinear primary video signal V1 becomes an RGB signal also complying to the standard IEC 61966-2-4 or IEC 61966-2-1.

The nonlinear primary video signal V1' and the nonlinear secondary video signal V2' are video signals having a nonlinear correspondence relationship between a signal value as a gradation value of its luminance and the luminance of an actual color corresponding to the signal value. In what follows, with respect to each of the nonlinear primary video signal V1' and the nonlinear secondary video signal V2', the signal corrected so as to have a linear correspondence relationship between a signal value and the luminance of an actual color corresponding to the signal value is referred to respectively as "a linear primary video signal V1" and "a linear secondary video signal V2".

The primary side gamma processing member 2 conducts processing for converting the nonlinear primary video signal V1' into the linear primary video signal V1 by providing the well-known gamma processing to the nonlinear primary video signal V1'. In addition, the gamma processing is also called as gamma correction processing. In general, the primary side gamma processing member 2 conducts gamma processing in conformity to a gamma curve having $1/2.2$ gamma value. The linear primary video signal V1 is also a video signal of a signal value that may obtain a value within the extended range W'. In addition, a signal conversion table or a conversion formula the primary side gamma processing member 2 refers to for the conversion from the nonlinear primary video signal V1' into the linear primary video signal V1 is previously recorded in a memory (such as a ROM) comprised in the video signal converter Q.

Additionally, the signal range adjusting member 3 conducts processing for converting the linear primary video signal V1 composed of luminance signals of each primary color (RGB) that may obtain a signal value in the extended range W' partially including the output range W into the linear secondary video signal V2 composed of luminance signals of each primary color (RGB) that may obtain a value in the output range W. Hereinafter, the processing the signal range adjusting member 3 conducts is described in details.

Firstly, the signal range adjusting member 3 calculates interim luminance values (Lr, Lg, and Lb) of each primary color (RGB) that can be obtained by assigning luminance signal values (Xr, Xg, and Xb) of each primary color (RGB) in the linear primary video signal V1 to the following formulas (A1) and (A2). The signal range adjusting member 3 for conducting the calculation is one example of the interim luminance value calculating means. Additionally, in the video signal converter Q, the luminance signal values (Xr, Xg, and Xb) of primary colors (RGB) in "primary video signal" in the formulas (A1) and (A2) are luminance signal values of each primary color (RGB) in the linear primary video signal V1.

$$\left.\begin{array}{l}\text{If } Xr < S\min \text{ Then } c = S\min - Xr,\ Xr' = S\min \quad \text{Else } c = 0,\ Xr' = Xr \\ \text{If } Xg < S\min \text{ Then } m = S\min - Xg,\ Xg' = S\min \quad \text{Else } m = 0,\ Xg' = Xg \\ \text{If } Xb < S\min \text{ Then } y = S\min - Xb,\ Xb' = S\min \quad \text{Else } y = 0,\ Xb' = Xb \end{array}\right\} \quad (A1)$$

$$\left.\begin{array}{l} Lr = Xr' + k \cdot y + k \cdot m \\ Lg = Xg' + k \cdot c + k \cdot y \\ Lb = Xb' + k \cdot m + k \cdot c \end{array}\right\} \quad (A2)$$

In the formulas (A1) and (A2),

Smin=output lower limit value (a lower limit value of each luminance signal in the secondary video signal)
Xr=a value of R luminance signal in a primary video signal
Xg=a value of G luminance signal in a primary video signal
Xb=a value of B luminance signal in a primary video signal
c, m, y, Xr', Xg', Xb'=variable
k=invariable (however, o<k)
Lr=R interim luminance value
Lg=G interim luminance value
Lb=B interim luminance value Here, there may be a case where the nonlinear secondary video signal V2' and the linear secondary video signal V2 are a video signal composed of luminance signals of each primary color (RGB) that may obtain a signal value in the range (one example of the output range W) between 0 to 1 as a normalized value. In such case, the nonlinear primary video signal V1' and the linear primary video signal V1 are a video signal composed of luminance signals of each primary color (RGB) that may obtain a signal value in the range (one example of the extended range W') between a negative value to a value greater than 1 as a normalized value. Furthermore, in this case, the output lower limit value Smin is 0, and the output upper limit value is Smax, and the formula (A1) can therefore be replaced with the following formula (A1'). The formula (A1') is one example of the formula (A1).

$$\left.\begin{array}{l}\text{If } Xr < 0 \text{ Then } c = -Xr,\ Xr' = 0 \quad \text{Else } c = 0,\ Xr' = Xr \\ \text{If } Xg < 0 \text{ Then } m = -Xg,\ Xg' = 0 \quad \text{Else } m = 0,\ Xg' = Xg \\ \text{If } Xb < 0 \text{ Then } y = -Xb,\ Xb' = 0 \quad \text{Else } y = 0,\ Xb' = Xb \end{array}\right\} \quad (A1')$$

$$\left.\begin{array}{l} Lr = Xr' + k \cdot y + k \cdot m \\ Lg = Xg' + k \cdot c + k \cdot y \\ Lb = Xb' + k \cdot m + k \cdot c \end{array}\right\} \quad (A2)$$

In the formulas (A1') and (A2),
Xr=a value of R luminance signal in a primary video signal
Xg=a value of G luminance signal in a primary video signal
Xb=a value of B luminance signal in a primary video signal
c, m, y, Xr', Xg', Xb'=variable
k=invariable (however, o<k)
Lr=R interim luminance value
Lg=G interim luminance value
Lb=B interim luminance value Moreover, the signal range adjusting member 3 produces the linear secondary video signal V2 based on the interim luminance values (Lr, Lg, and Lb) of each primary color (RGB), when the interim luminance values (Lr, Lg, and Lb) of each primary color (RGB) include a value greater than the output upper limit value Smax, in other words, when one or more conditions among the three conditions: "Lr>Smax", "Lg>Smax", and "Lb>Smax" is approved. This linear secondary video signal V2 is a signal of a value, obtained by converting the interim luminance values (Lr, Lg, and Lb) of each primary color (GRB) into values within the output range W in accordance with a predetermined secondary conversion rule. The signal range adjusting member 3 for conducting this processing is one example of the secondary video signal producing means.

Here, as the predetermined secondary conversion rule, for example, there can be a conversion rule in accordance with the following formula (B1). Additionally, in the present video signal converter Q, values (Yr, Yg, and Yb) of luminance signals of primary colors (RGB) in the "secondary video signal" in the formula (B1) are values of luminance signals of each primary color (RGB) in the linear secondary video signal V2.

$$Lmax = \max[Lr, Lg, Lb] \quad (B1)$$

$$\begin{aligned} &\text{If } Lmax > Smax \\ &\text{Then } \left. \begin{array}{l} Yr = Smin + (Lr - Smin) \cdot (Smax - Smin)/(Lmax - Smin) \\ Yg = Smin + (Lg - Smin) \cdot (Smax - Smin)/(Lmax - Smin) \\ Yb = Smin + (Lb - Smin) \cdot (Smax - Smin)/(Lmax - Smin) \end{array} \right\} \\ &\text{Else } Yr = Lr, Yg = Lg, Yb = Lb \end{aligned}$$

In the formula (B1),
Smin=output lower limit value (a lower limit value of each luminance signal in a secondary video signal)
Smax=output upper limit value (an upper limit value of each luminance signal in a secondary video signal)
Lr=R interim luminance value
Lg=G interim luminance value
Lb=B interim luminance value
Yr=a value of R luminance signal in a secondary video signal
Yg=a value of G luminance signal in a secondary video signal
Yb=a value of B luminance signal in a secondary video signal In the formula (B1), there is shown a rule for linearly compressing all the interim luminance values (Lr, Lg, and Lb) of each primary color (RGB) in response to the ratio of a width (Smax−Smin) of the output range W to the width (Lmax−Smin) of the range from the output lower limit value Smin to the maximum value Lmax in the interim luminance values of each primary color (RGB).

The conversion rule based on the formula (B1) is one example of the rule for replacing the maximum value "Lmax" among the interim luminance values (Lr, Lg, and Lb) of each primary color (RGB) with the output upper limit value Smax, and moreover, compressing other interim luminance values based on a compression coefficient decided in accordance with the magnitude of the maximum value "Lmax" among the interim luminance values (Lr, Lg, and Lb). Additionally, the compression coefficient in the conversion rule based on the formula (B1) is the ratio of the width (Smax−Smin) of the output range W to the width (Lmax−Smin) from the output lower limit value S to the maximum value Lmax in the interim luminance values.

Other than the above-mentioned calculating method (finding method) of the compression coefficient, for example, a method for calculating the compressing coefficient based on a quadric function, an exponent function, or the like may be employed, said compressing coefficient asymptotically approaching to a prescribed convergence value (a value greater than 0 and smaller than 1) from 1 with a difference (Lmax−Smax) between the maximum value Lmax in the interim luminance values and the output upper limit value Smax increased. The interim luminance value other than the maximum value 'Lmax' among the interim luminance values (Lr, Lg, and Lb) of each primary color (RGB) is multiplied by the compression coefficient determined as described above, thereby compressing the signal value (luminance value).

Also, as the secondary conversion rule, a conversion rule based on the following formula (B2) may be employed. Additionally, in the present video signal converter Q, values (Yr, Yg, and Yb) of luminance signals of primary colors (RGB) in the "secondary video signal" in the formula (B2) are values of luminance signals of each primary color (RGB) in the linear secondary video signal V2.

$$\left. \begin{array}{llllll} \text{If} & Lr > Smax & \text{Then} & Yr = Smax & \text{Else} & Yr = Lr \\ \text{If} & Lg > Smax & \text{Then} & Yg = Smax & \text{Else} & Yg = Lg \\ \text{If} & Lb > Smax & \text{Then} & Yb = Smax & \text{Else} & Yb = Lr \end{array} \right\} \quad (B2)$$

In the formula (B2),
Smax=output upper limit value (an upper limit value of each luminance signal in a secondary video signal)
Lr=R interim luminance value
Lg=G interim luminance value
Lb=B interim luminance value
Yr=a value of R luminance signal in a secondary video signal
Yg=a value of G luminance signal in a secondary video signal
Yb=a value of B luminance signal in a secondary video signal The formula (B2) shows a clip processing for replacing a value among the interim luminance values (Lr, Lg, and Lb) of each primary color (RGB) greater than the output upper limit value Smax with the output upper limit value Smax. However, when this clip processing is employed, the color continuity of the linear secondary video signal V2 is deteriorated.

On the other hand, when the interim luminance values (Lr, Lg, and Lb) of each primary color (RGB) do not include a value greater than the output upper limit value Smax, in short, when the conditions: "Lr≦Smax", "Lg≦Smax", and "Lb≦Smax" are all approved, the signal range adjusting member 3 produces the linear secondary video signal V2 composed of the interim luminance values (Lr, Lg, and Lb) of each primary color (RGB). The signal range adjusting member 3 for conducting this processing is one example of the secondary video signal producing means. In short, when the conditions: "Lr≦Smax", "Lg≦Smax", and "Lb≦Smax" are all approved, the signal range adjusting member 3 produces the linear secondary video signal V2 having the interim luminance values (Lr, Lg, and Lb) of each primary color (RGB) directly as the signal values (Yr, Yg, and Yb).

The linear secondary video signal V2 produced by the signal range adjusting member 3 in a manner mentioned above is a signal with its signal values (Yr, Yg, and Yb) possible to be within the output range W1.

In addition, the secondary side gamma processing member 4 converts the linear secondary video signal V2 into the nonlinear secondary video signal V2' by subjecting a well-known gamma processing to the linear secondary video signal V2 produced by the signal range adjusting member 3. This nonlinear secondary video signal V2' is composed of luminance signals of each Red, Green, and Blue. In general, the secondary side gamma processing member 4 conducts gamma processing in conformity to a gamma curve having a gamma value 2.2 (an inverse number of a gamma value in the primary side gamma processing member 2). The nonlinear secondary video signal V2' produced by the secondary side gamma processing member 4 also becomes a signal having signal values (Yr, Yg, and Yb) within the output range W1. Then, the display 5 displays a video based on the nonlinear secondary video signal V2' output from the secondary side gamma processing member 4.

In what follows, a conversion processing of a video signal by the video signal converter Q is described. Additionally, in the following description, a value obtained by subtracting the output lower limit value (Smin) from luminance signal values (Xr, Xg, and Xb) of each primary color (RGB) is called "gradation level".

When the signal values (Xr, Xg, and Xb) of the linear primary video signal V1 are within the output range W, the video signal converter Q regards the linear primary video signal V1 as the linear secondary video signal V2 as it is. In short, in the formulas (A1) and (A2), the interim luminance values have Lr=Xr, Lg=Xg, and Lb=Xg, and the interim luminance values as they are become values (Yr, Yg, and Yb) of a luminance signal of primary colors (RGB) in the linear secondary video signal V2.

And also, when a gradation level of a primary color in the linear primary video signal V1 is negative, in other words, when any one of signal values Xr, Xg, and Xb is smaller than the output lower limit value Smin, the video signal converter Q immediately replaces the negative gradation level with positive gradation levels of other two primary colors having a level corresponding to its magnitude (absolute value). For example, when the output range is 0 to 1, and when the value Xr of the R luminance signal in the linear primary video signal V1 is −0.1, the signal range adjusting member 3 replaces the negative gradation level −0.1 of Xr of the R luminance signal with the positive gradation levels (kc) of two primary colors (G and B) according to its magnitude. However, a calculation formula for the negative gradation level −0.1 is "−0.1–0" and "c=0−(−0.1)", where k is an invariable. This means that the negative gradation level "−c" of a primary color R is replaced with a positive gradation level "c" of cyan as a complementary color of the primary color R, and further, the positive gradation level "c" of cyan is converted into positive gradation levels "kc" of each of other two primary colors (G and B) by means of an additive color mixture.

Similarly, when the output range is 0 to 1, and when the value Xg of the G luminance signal in the linear primary video signal V1 is −0.1, the signal range adjusting member 3 replaces the negative gradation level −0.1 of Xg of the G luminance signal with the positive gradation levels "km" of other two primary colors (R and B) according to its magnitude. However, a calculation formula for the negative gradation level −0.1 is "−0.1–0" and "m=0−(−0.1)", where k is an invariable. This means that the negative gradation level (−m) of a primary color G is replaced with a positive gradation level (m) of magenta as a complementary color for the primary color G, and further, the positive gradation level (m) of the magenta is converted into positive gradation levels (km) of each of other two primary colors (R and B) by means of an additive color mixture.

Similarly, when the output range is 0 to 1, and when the value Xb of the B luminance signal in the linear primary video signal V1 is −0.1, the signal range adjusting member 3 replaces the negative gradation level −0.1 of Xb of the B luminance signal with the positive gradation levels "ky" of other two primary colors (R and G) according to its magnitude. However, a calculation formula for the negative gradation level −0.1 is "−0.1–0" and "y=0−(−0.1)", where k is an invariable. This means that the negative gradation level "−y" of a primary color B is replaced with a positive gradation level "y" of magenta as a complementary color of the primary color B, and further, the positive gradation level "y" of the magenta is converted into positive gradation levels "ky" of each of other two primary colors (R and G) by means of an additive color mixture.

FIG. 3 is a conceptual diagram vectorially expressing that a signal range adjusting member 3 replaces a negative gradation level of a primary color B with positive gradation levels of each of other two primary colors (R, G). In FIG. 3, the arrows in six directions indicate coordinate axes of primary colors R, G, and B, and the complementary colors thereof: cyan (C), magenta (M), and yellow (Y).

As shown in FIG. 3, when the gradation level "Xb−Smin" of a primary color B in the linear primary video signal V1 is negative, the signal range adjusting member 3 replaces the negative gradation level with a positive gradation level "y" of yellow as a complementary color of a primary color B, and further, the positive gradation level "y" of the yellow is replaced with positive gradation levels "ky" of each of other two primary colors (R and G) by means of an additive color mixture. In addition, the example shown in FIG. 3 is of where k=1.

FIGS. 4 to 7 are views expressing in xy chromaticity diagrams concrete examples of reproductive colors of video signals. And also, in FIGS. 4 to 7, the area indicated by a frame of solid line and inside thereof is a color gamut reproducible by the display 5 as a so-called high-definition display, in short, a color gamut of the linear secondary video signal V2 and the nonlinear secondary video signal V2', while the area indicated by a frame of dashed line and inside thereof is a color gamut of CIE1931 chromaticity diagram. In FIGS. 4 to 7, the output range is 0 to 1, "Smin=0", and "Smax=1".

Also, the conversion formula for converting from signal values of primary colors (RGB) into coordinate values x and y in a chromaticity diagram is the following formula (E1) which is prescribed in IEC 61966-2-4. In addition, RGB in the formula $$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R \\ G \\ B \end{pmatrix}$$
$$x = X/(X+Y+Z)$$
$$y = Y/(X+Y+Z)$$
(E1)

(E1) are luminance values of each primary color (RGB), while x and y are coordinate values in the xy chromaticity diagram.

In addition, in the processing of the signal range adjusting member 3, the invariable k in the formula (A2) is supposedly 0.5, and the secondary conversion rule is supposedly a conversion rule based on the formula (B1).

Figure 4:
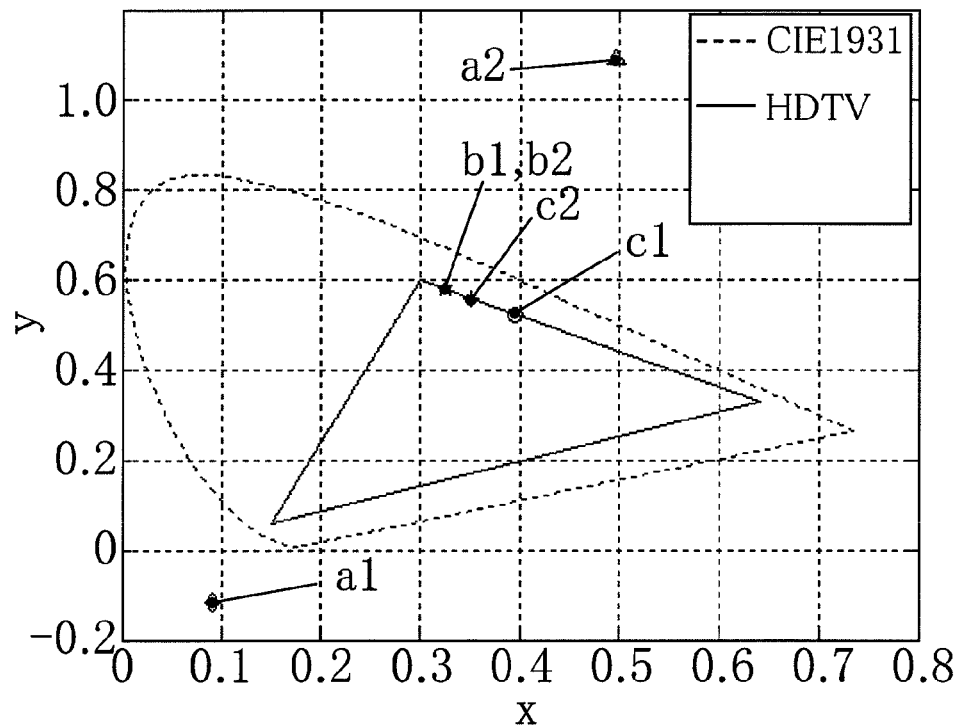
FIG. 4 is a view expressing in a chromaticity diagram a concrete example (the first example) of a reproductive color of a video signal.

In FIG. 4, a coordinate a1 of a first color is a coordinate when signal values (RGB) in a video signal are signal values (0.027397, 0, and −0.803228) including a negative value. And also, a coordinate a2 of a second color is a coordinate when signal values (RGB) in a video signal are signal values (0.027397, 0, and −0.100000) including a negative value. In addition, coordinates b1 and b2 are the coordinate of colors obtained by converting signal values in a video signal indicating each the first and the second colors into signal values within the output range W by means of a clip processing. Also, coordinates c1 and c2 are the coordinate of colors obtained by the signal range adjusting member 3 by converting signal values of the linear primary video signal V1 as a video signal indicating each the first and the second colors into signal values within the output range W.

As can be seen from FIG. 4, the clip processing converts the first color (coordinate a1) and the second color (coordinate a2) different each other into the same color (the same coordinates b1 and b2) within the color gamut of the display 5 by means of signal conversion. On the other hand, as can be seen from FIG. 4, the processing of the signal range adjusting member 3 converts the first color (coordinate a1) and the second color (coordinate a2) different each other into different colors (coordinates c1 and c2 different each other) within the color gamut of the display 5 by means of signal conversion.

Figure 5:
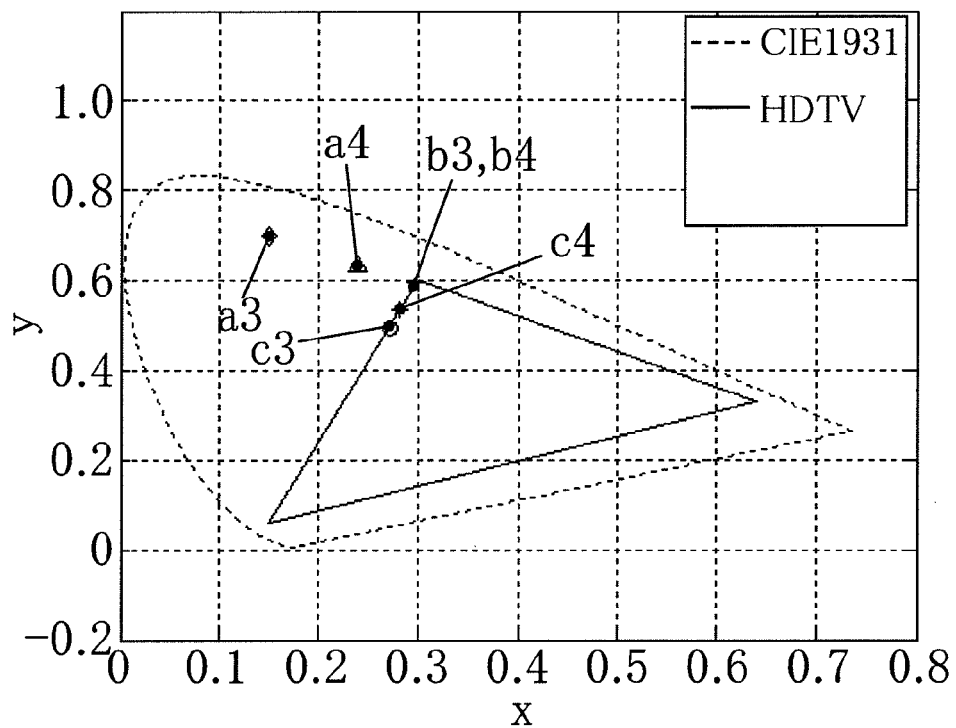
FIG. 5 is a view expressing in a chromaticity diagram a concrete example (the second example) of a reproductive color of a video signal.

And also, in FIG. 5, a coordinate a3 of a third color is a coordinate when signal values (RGB) in a video signal are signal values (−0.6647, 1.1739, and 0.0241) including a negative value and a value greater than 1. In addition, a coordinate a4 of a fourth color is a coordinate when signal values (RGB) in a video signal are signal values (−0.3, 1.1739, and 0.0241) including a negative value and a value greater than 1. And also, coordinates b3 and b4 are the coordinate of colors obtained by converting signal values in a video signal indicating each the third and the fourth colors into signal values within the output range W by means of a clip processing. Also, coordinates c3 and c4 are the coordinate of colors obtained by the signal range adjusting member 3 by converting signal values in the linear primary video signal V1 indicating each the third and the fourth colors into signal values within the output range W.

As can be seen also from FIG. 5, the clip processing converts the third color (coordinate a3) and the fourth color (coordinate a4) different each other into the same color (the same coordinates b3 and b4) within the color gamut of the display 5 by means of signal conversion. On the other hand, as can be seen from FIG. 5, the processing of the signal range adjusting member 3 converts the third color (coordinate a3) and the fourth color (coordinate a4) different each other into different colors (coordinates c3 and c4 different each other) within the color gamut of the display 5 by means of signal conversion.

Figure 6:
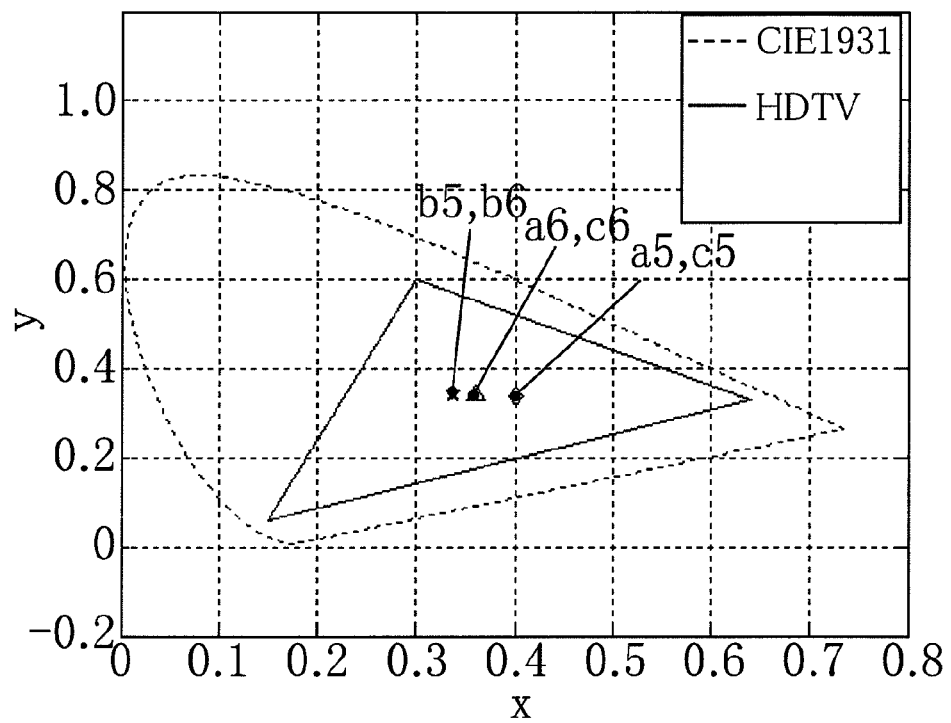
FIG. 6 is a view expressing in a chromaticity diagram a concrete example (the third example) of a reproductive color of a video signal.

And also, in FIG. 6, a coordinate a5 of a fifth color is a coordinate when signal values (RGB) in a video signal are signal values (2.0, 0.8, and 0.7) including one value greater than 1. Additionally, a coordinate a6 of a sixth color is a coordinate when signal values (RGB) in a video signal are signal values (1.3, 0.8, and 0.7) including one value greater than 1. In addition, coordinates b5 and b6 are the coordinate of colors obtained by converting signal values in a video signal indicating each fifth and the sixth colors into signal values within the output range W by means of a clip processing. Also, coordinates c5 and c6 are the coordinate of colors obtained by the signal range adjusting member 3 by converting signal values in the linear primary video signal V1 indicating each the fifth and the sixth colors into signal values within the output range W.

As can be seen also from FIG. 6, the clip processing converts the fifth and the six colors different each other into the same color (the same coordinates b5 and b6) within the color gamut of the display 5 by means of signal conversion. On the other hand, as can be seen from FIG. 6, the processing of the signal range adjusting member 3 converts the fifth color and the sixth color different each other into different colors (coordinates c5 and c6 different each other) within the color gamut of the display 5 by means of signal conversion.

Figure 7:
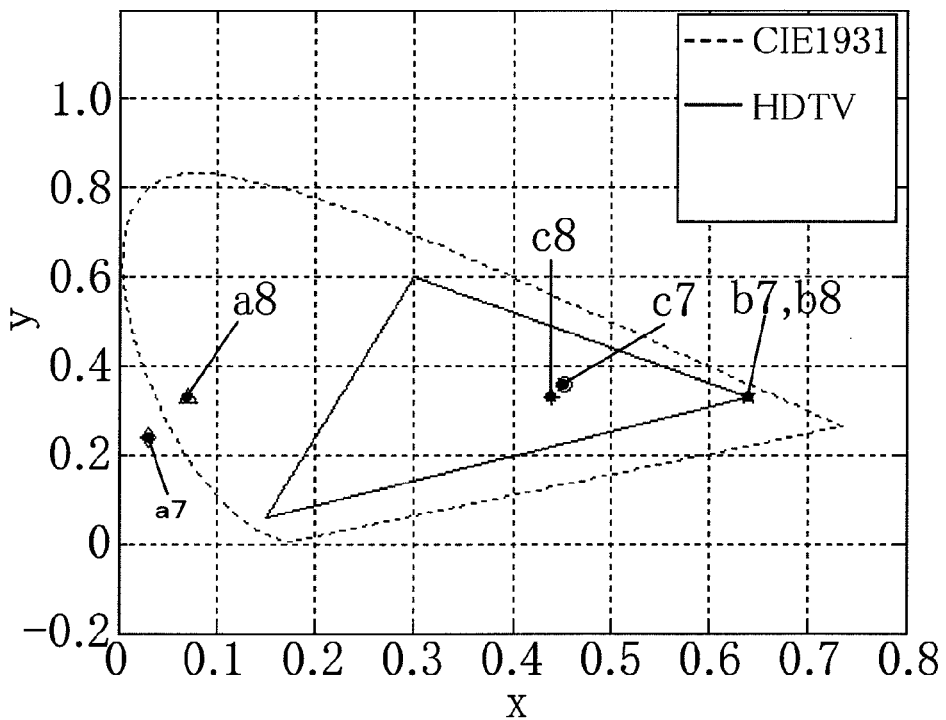
FIG. 7 is a view expressing in a chromaticity diagram a concrete example (the fourth example) of a reproductive color of a video signal.

And also, in FIG. 7, a coordinate a7 of a seventh color is a coordinate when signal values (RGB) in a video signal are signal values (0.7, −0.5, and −0.8) including two negative values. And also, a coordinate a8 of a eighth color is a coordinate when signal values (RGB) in a video signal are signal values (0.5, −0.5, and −0.8) including two negative values. In addition, coordinates b7 and b8 are the coordinate of colors obtained by converting signal values in a video signal indicating each the seventh and the eighth colors into signal values within the output range W by means of a clip processing. Also, coordinates c7 and c8 are the coordinate of colors obtained by the signal range adjusting member 3 by converting signal values in the linear primary video signal V1 indicating each the seventh and the eighth colors into signal values within the output range W.

As can be seen also from FIG. 7, the clip processing converts the seventh color (coordinate a7) and the eighth color (coordinate a8) different each other into the same color (the same coordinates b7 and b8) within the color gamut of the display 5 by means of signal conversion. On the other hand, as can be seen from FIG. 7, the processing of the signal range adjusting member 3 converts the seventh color (coordinate a7) and the eighth color (coordinate a8) different each other into different colors (coordinates c7 and c8 different each other) within the color gamut of the display 5 by means of signal conversion.

As shown in FIGS. 4 to 7, even when the linear primary video signal V1 is a signal indicating the color outside of the color gamut of the display 5, the video display device Z can display on the display 5 the color of the video signal by an alternative color. Moreover, the display color of the display 5 changes according to a signal value change of the linear primary video signal V1, so that the color continuity of the display color of the display 5 can be ensured. In short, a gradation failure can be prevented.

Next, a relationship between a color phase of the linear primary video signal V1 and the one of the linear secondary video signal V2 is described.

The relationship between signal values (Xr, Xg, and Xb) of RGB signal in the linear primary video signal V1 when the output lower limit value Smin is 0 and a Ycbcr signal corresponding to the RGB signal is expressed in the following (C1). Additionally, the Ycber signal is a signal constituted by a combination of a luminance value Y, a color difference Cb of primary color B, and a color difference Cr of primary color R.

$$\left.\begin{array}{l} Y = C1 \cdot Xr + C2 \cdot Xg + C3 \cdot Xb \\ C1 + C2 + C3 = 1 \\ Cb = Xb - Y \\ Cr = Xr - Y \end{array}\right\} \quad (C1)$$

However, Y is a luminance value of a primary video signal (YCbCr signal) Cb is a color difference of primary color B in a primary video signal (YCbCr signal) Cr is a color difference of primary color R in a primary video signal (YCbCr signal) C1, C2, and C3 are predetermined invariables According to the formula (C1), a signal value ratio Cr/Cb of both color differences in the Ycbcr signal corresponding to the linear primary video signal V1 is expressed in the following formula (C2).

$$\frac{Cr}{Cb} = \frac{-(C1-1)\cdot Xr - C2\cdot Xg - C3\cdot Xb}{-C1\cdot Xr - C2\cdot Xg - (C3+1)\cdot Xb} \} \quad (C2)$$

On the other hand, the relationship between signal values (Yr, Yg, and Yb) of RGB signal in the linear secondary video signal V2 when the output lower limit value Smin is 0 and a Ycbcr signal corresponding to the RGB signal is expressed in the following (D1). Additionally, the Ycbcr signal is a signal composed of the $$\left.\begin{array}{l} Y' = C1\cdot Yr + C2\cdot Yg + C3\cdot Yb \\ C1 + C2 + C3 = 1 \\ Cb' = Yb - Y' \\ Cr' = Yr - Y' \end{array}\right\} \quad (D1)$$

combination of a luminance value Y', a color difference Cb' of primary color B, and a color difference Cr' of primary color R.

However, Y' is a luminance value of a primary video signal (YCbCr signal) Cb' is a color difference of primary color B in a primary video signal (YCbCr signal) Cr' is a color difference of primary color R in a primary video signal (YCbCr signal) C1, C2, and C3 are predetermined invariables.

Here, a state is considered where only the signal value Xb of primary color B in the linear primary video signal V1 is less than the output lower limit value Smin, while the signal values Xr and Xb of other two primary colors (R and G) and the interim luminance values (Lr, Lg, and Lb) of the primary colors (RGB) are within the output range W. Here, the signal values Xr and Xb and the interim luminance values (Lr, Lg, and Lb) do not surpass the output upper limit value Smax. In this case, the following formula (D2) can be obtained from the formulas (A1) and (A2).

$$\left.\begin{array}{l} Yr = Lr = Xr - k\cdot Xb \\ Yg = Lg = Xg - k\cdot Xb \\ Yb = Lb = 0 \end{array}\right\} \quad (D2)$$

To assign (to apply) the formula (D2) into the formula (D1) gives the following formula (D3).

$$\left.\begin{array}{l} Cb' = Yb - Y' \\ \quad = -C1\cdot Xr - C2\cdot Xg - k\cdot(C3-1)\cdot Xb \\ Cr' = Yr - Y' \\ \quad = -(C1-1)Xr - C2\cdot Xg - k\cdot C3\cdot Xb \end{array}\right\} \quad (D3)$$

According to this formula (D3), a signal value ratio Cr'/Cb' of both color differences in the Ycbcr signal corresponding to the linear secondary video signal V2 is expressed in the following formula (C4).

$$\frac{Cr'}{Cb'} = \frac{-(C1-1)Xr - C2\cdot Xg - k\cdot C3\cdot Xb}{-C1\cdot Xr - C2\cdot Xg - k\cdot(C3-1)\cdot Xb} \} \quad (D4)$$

As is well-known, when the signal value ratios of color difference (Cr/Cb and Cr' and Cb') of two Ycbcr signals agree, colors expressed by each of these two Ycbcr signals have the same color phase. Here, the invariable k is preferred to be at least 1 so that Cr/Cb according to the formula (C2) and Cr'/Cb' according to the formula (D4) agree. What mentioned about the color phase agreement in the above is also the same, even when the combination of signal values of primary colors (RGB) in the linear primary video signal V1 is different.

Accordingly, when the invariable k is 1 in the formula (A2), in many cases, in short, when the interim luminance values Lr, Lg, and Lb do not exceed the output upper limit value Smax, the color phase of a color indicated by a video signal can be maintained both before and after signal conversion by the signal range adjusting member 3. This allows, when an original color the linear primary video signal V1 expresses is a color outside of the color gamut of the display 5, a color approximately-same as the original color to be reproduced on the display 5.

And also, the color phase can be maintained both before and after signal conversion based on the formula (B1) due to an unchanged ratio of luminance values of primary colors (RGB). Consequently, when the invariable k in the formula (A2) is supposedly 1, and the secondary conversion rule is supposedly employed as a conversion rule based on the formula (B1), the color phase of a color expressed by a video signal before and after the signal conversion of the signal range adjusting member 3, in short, before and after the adjustment of the range of signal values can match.

As shown in the above, according to the video display device Z, when the signal values (Xr, Xg, and Xb) in the linear primary video signal V1 are within the output range W, the linear primary video signal V1 directly becomes the linear secondary video signal V2. Therefore, the original color the nonlinear primary video signal V1' and the linear primary video signal V1 express is accurately reproduced by the display 5.

Also, in the video display device Z, with respect to each of the luminance signals of three primary colors in the linear primary video signal V1, when the values (Xr, Xg, and Xb) are less than the output lower limit value Smin, in short, when the gradation level is negative, the negative gradation level of the present primary color is replaced with positive gradation levels of other two primary colors according to its absolute value. Consequently, according to the video display device Z, when the nonlinear primary video signal V1' and the linear primary video signal V1 are a signal indicating the color in an area outside of the color gamut of the display 5, and when at least the gradation level of the signal is negative, in many cases, in short, when the interim luminance values (Lr, Lg, and Lb) do not exceed the output upper limit value Smax, the color continuity in the area outside of the color gamut of the display 5 can be ensured. In short, a gradation failure can be prevented. Particularly, when the invariable k is 1 in the formula (A2), and when an original color the linear primary video signal V1 expresses is a color outside of the color gamut of the display 5, a color having the same color phase as the original color can be reproduced on the display 5. Moreover, the conversion processing of video signals the video signal converter Q conducts can be realized by simple four arithmetic operations based on signal values of each primary color (RGB).

However, the interim luminance values Lr, Lg, and Lb of each primary color (RGB) may rarely exceed the output upper limit value. In such case, when the linear secondary video signal V2 is produced by compressing the interim luminance values (Lr, Lg, and Lb) in accordance with the formula (B1), the color phase of the linear primary video signal V1 also can be maintained in the linear secondary video signal V2 in the area outside of the color gamut of the display 5.

With respect to two video signals before and after the signal conversion, as mentioned above, the color gamut may be compressed, while matching a color difference signal of ratio Cr/Cb at the time of expressing the original video signal with Ycbcr signal and a color difference signal of ratio Cr'/Cb' at the time of expressing the converted video signal, so that the color phase can be maintained. However, regarding a Ycbcr signal, to perform a color gamut compression so as to give a result of Cr/Cb=Cr'/Cb', for example, the following procedure is required to calculate the converted video signal.

Firstly, θ is supposedly set θ=arctan(Cr/Cb)=arctan(Cr'/Cb'), and with respect to the color phase of this 0, the color gamut range is specified based on the formula (D1) such that signal values of RGB do not exceed the output range. Then a color within the specified color gamut range, in short, a color the converted Ycbcr signal expresses is specified in accordance with a predetermined rule.

However, when conducting signal conversion processing in a procedure as mentioned above, it is required to perform the operation of a complicated trigonometric function and the operation for solving a binary linear equation, thereby increasing the arithmetic load.

On the other hand, according to the video signal converter Q, simple condition judging processing along with four arithmetic operations as shown in the formulas (A1), (A2), (B1), and (B2) allows the signal conversion processing of low arithmetic load to be performed.

Next, as referring to the block diagram shown in FIG. 2, a video display device Z' as an application example of the video display device Z is described. In addition, the components in FIG. 2 same as those of the video display device Z shown in FIG. 1 are allotted with the same numerals.

In the video signal converter Q in the video display device Z, a primary video signal before the adjustment of the signal value range, in short, before the signal conversion is a linear video signal (the linear primary video signal V1) which is what the nonlinear primary video signal V1' as a video signal complying to the standards IEC 61966-2-4 and IEC 61966-2-1 is subjected to gamma processing by the primary side gamma processing member 2.

Furthermore, in the video signal converter Q, a secondary video signal after the adjustment of its signal value range is a linear video signal, in other words, the linear secondary video signal V2, while a nonlinear signal, obtained by subjecting said video signal to gamma processing by the secondary side gamma processing member 4, in short, the nonlinear secondary video signal V2' is a video signal complying to the standards such as ITU-R BT.709 and ITU-R BT.601-5.

This prevents image quality deterioration which might occur when a nonlinear video signal is subjected to linear processing, even when the formulas (A2) and (B1) as a simple linear formula for signal conversion are employed.

On the other hand, the video display device Z' comprises, in place of the video signal converter Q in the video display device Z, a video signal converter Q', which is what the primary side gamma processing member 2 and the secondary side gamma processing member 3 are eliminated from the video signal converter Q. In short, the video signal converter Q' comprises the RGB signal producing member 1 and the signal range adjusting member 3.

And the signal range adjusting member 3 in the video signal converter Q' firstly calculates interim luminance values (Lr, Lg, and Lb) of each primary color (RGB). Here, the interim luminance values (Lr, Lg, and Lb) are a luminance value of each primary color (RGB) that can be obtained by applying (assigning) a luminance signal value of each primary color (RGB) in the nonlinear primary video signal V1' produced by the RGB signal producing member 1 to the formulas (A1) and (A2). In addition, the video signal converter Q' for conducting this processing is one example of the interim luminance value calculating means. Additionally, in the video signal converter Q', luminance signal values (Xr, Xg, and Xb) of primary colors (RGB) in "primary video signal" in the formulas (A1) and (A2) are luminance signal values of each primary color (RGB) in the nonlinear primary video signal V1'.

Furthermore, the signal range adjusting member 3 in the video signal converter Q' produces the nonlinear secondary video signal V2' (one example of the secondary video signal producing means) when interim luminance values (Lr, Lg, and Lb) of each primary color (RGB) include a value greater than the output upper limit value Smax, in other words, when one or more conditions among the three conditions: "Lr>Smax", "Lg>Smax", and "Lb>Smax" is approved. The nonlinear secondary video signal V2' produced here is a signal of a value, obtained by converting interim luminance values (Lr, Lg, and Lb) of each primary color (RGB) into values within the output range W by means of the secondary conversion rule.

Here, as the predetermined secondary conversion rule, for example, there can be conversion rules in accordance with the following formulas (B1) and (B2). Additionally, in the video signal converter Q', luminance signal values (Yr, Yg, and Yb) of primary colors (RGB) in "secondary video signal" in accordance with the formulas (B1) and (B2) are luminance signal values of each primary color (RGB) in the nonlinear secondary video signal V2'.

As mentioned, in the video signal converter Q', the primary video signal before the adjustment of its signal value range is a video signal complying to the standards IEC 61966-2-4 and IEC 61966-2-1, in short, is the nonlinear primary video signal V1'.

Furthermore, in the video signal converter Q', the nonlinear secondary video signal V2' as a secondary video signal after the adjustment of its signal value range is a video signal complying to the standards such as ITU-R BT.709 and ITU-R BT.601-5.

Similar to the video signal converter Q', when signal conversion is performed using a linear formula such as the formulas (A1) and (B1) to the nonlinear primary video signal V1', image quality deterioration cannot be avoided completely, however, there can be a great effect of decreasing the arithmetic load with two gamma processing omitted. Such video signal converter Q' as well as the video display device Z' comprising thereof are one example of the embodiment of this invention.

The processing for conducting the calculation of the aforementioned formula (A1) or (A1') and the formula (A2) is a processing for conducting the replacement and the addition as shown in below, when one or more of luminance signal values (Xr, Xg, and Xb) of each primary color (RGB) in the primary video signal including the minimum value is less than the output lower limit value Smin. In short, the replacement processing is for replacing a signal value less than the output lower limit value Smin in the primary video signal with the output lower limit value Smin. Also, the addition processing is for adding a positive complementary value proportional to the difference between the output lower limit value Smin and a signal value less than said output lower limit value Smin to signal values of the rest of two primary colors other than the signal value less than said output lower limit value Smin in the primary video signal. Here, the proportionality coefficient is k. This processing is a conversion processing for, when a gradation level of a color is negative, replacing the negative gradation level with a positive gradation level of a complementary color of the color. Hereinafter, such processing is referred to as "complementary color conversion processing".

And then, in the above-mentioned embodiment, when luminance signal values of three primary colors in the primary video signal include two or more signals having a value smaller than the output lower limit value, in short, having negative gradation level, the complementary color conversion processing is performed for all of the two or more primary colors.

However, conducting the complementary color conversion processing for only the minimum value among a plurality of values having negative gradation levels in the primary video signal may cause non-existence of primary colors having a negative gradation level. In such case, in regard to a color other than the color of negative gradation level, there is no need to conduct the complementary color conversion processing for the negative gradation level.

In addition, when gradation levels of all of the three primary colors of the primary video signal are negative, the complementary color conversion processing is performed only for two primary colors having the smaller gradation levels, and when there is no primary color of negative gradation level, similarly, there is no need to perform the complementary color conversion processing for all of the three primary colors.

Here, the signal range adjusting member 3 in the video signal converter Q may execute the processing in steps S1 to S3 as described below, when luminance signal values (Xr, Xg, and Xb) of each primary color (RGB) in the primary video signal include a value less than the output lower limit value Smin.

[Step S1]

To set the output lower limit value Smin to a signal value of the color having a primary signal minimum value Xmin, when the primary signal minimum value Xmin as the minimum value among each signal value (Xr, Xg, and Xb) in the primary video signal is less than the output lower limit value Smin. Furthermore, to perform a processing to set the signal values, obtained by adding a positive complementary value {k×(Smin−Xmin)} proportional to the difference between the output lower limit value Smin and the primary signal minimum value Xmin to signal values of two colors other than the primary signal minimum value Xmin in the primary video signal, as signal values of the other two colors, so that interim luminance values (Lr, Lg, and Lb) of each of the primary colors (RGB) can be calculated (one example of interim luminance value calculation processing). Hereinafter, the processing performed in this step S1 is called the first complementary color conversion processing. The formula expressing the $$\left.\begin{array}{l}X\min = \operatorname{Min}(Xr, Xg, Xb) \\ \text{If } X\min \geq S\min \\ \text{Then } Xr' = Xr,\ Xg' = Xg,\ Xb' = Xb,\ c = m = y = 0 \\ \text{Else IF } X_r = X\min \\ \text{Then } Xr' = S\min,\ Xg' = Xg,\ Xb' = Xb,\ c = S\min - Xr, \\ m = y = 0 \\ \text{Else IF } Xg = X\min \\ \text{Then } Xr' = Xr,\ Xg' = S\min,\ Xb' = Xb,\ m = S\min - Xg, \\ c = y = 0 \\ \text{Else IF } Xb = X\min \\ \text{Then } Xr' = Xr,\ Xg' = Xg,\ Xb' = S\min,\ y = S\min - Xb, \\ c = m = 0 \\ Lr = Xr' + k \cdot y + k \cdot m \\ Lg = Xg' + k \cdot c + k \cdot y \\ Lb = Xb' + k \cdot m + k \cdot c \end{array}\right\} \quad (F1)$$

processing of the step S1 is the following formula (F1).

In the formula (F1),
Smin=output lower limit value (a lower limit value of each luminance signal in a secondary video signal)
Xr=a value of R luminance signal in a primary video signal
Xg=a value of G luminance signal in a primary video signal
Xb=a value of B luminance signal in a primary video signal
c, m, y, Xr', Xg', Xb', Xmin=variable
k=invariable (however, o<k)
Lr=R interim luminance value
Lg=G interim luminance value
Lb=B interim luminance value In what follows, one example of calculation processing of the interim luminance values (Lr, Lg, and Lb) of each primary color (RGB) based on the formula (F1) is described.

For example, when the primary signal minimum value Xmin as the minimum value among each signal value (Xr, Xg, and Xb) in the primary video signal is equal to Xg, in short, when "Xmin=Xg", the calculation result of interim luminance values (Lr, Lg, and Lb) of each of the primary colors (RGB) based on the formula (F1) is as follows.

In short, when the minimum value Xg among each signal value (Xr, Xg, and Xb) in the primary video signal is less than the output lower limit value Smin, the output lower limit value Smin is set as the interim luminance value Lg as a signal value of color G having a primary signal minimum value.

Furthermore, the signal values, obtained by adding a positive complementary value {k×m (however, m=Smin−Xmin)} proportional to the difference between the output lower limit value Smin and the primary signal minimum value Xg (=Xmin) to signal values Xr and Xb of two colors other than the primary signal minimum value Xr in the primary video signal, are set as interim luminance values Lr and Lb of other two colors R and B.

The above is no different even when a magnitude relationship between a signal value of each color is different.

When the interim luminance values (Lr, Lg, and Lb) of each primary color (RGB) obtained by the processing in the step S1 do not include a value less than the output lower limit value Smin, production processing of the secondary video signal based on the aforementioned interim luminance values (Lr, Lg, and Lb) of each primary color (RGB) is executed. In short, a processing according to circumstances, whether or not the interim luminance values (Lr, Lg, and Lb) of each primary color (RGB) include a value greater than the output upper limit value Smax, is executed.

[Step S2]

On the other hand, after the first complementary color conversion processing (S1), when the minimum value L1min among signal values L11, L12, and L13 of each primary color (RGB) obtained by the processing is less than the output lower limit value Smin, the signal range adjusting member 3 executes the second complementary color conversion processing as described below. Hereinafter, the signal values L1, L12, and L13 are called first complementary color conversed signal values, and the minimum value L1min among them is called a first complementary color conversed signal's minimum value.

The second complementary color conversion processing sets the output lower limit value Smin for a signal value of the color having the first complementary color conversed signal's minimum value L1min, and at the same time, setting a value to signal values of other two colors, said value obtained by adding a positive complementary value {k×(Smin−L1min)} proportional to the difference between the output lower limit value Smin and the first complementary color conversed signal's minimum value L1min to the signal values of two color other than the first complementary color conversed signal's minimum value L1min among the first complementary color conversed signal values L11, L12, and L13 obtained by the first complementary color conversion processing (S1). This execution of the second complementary color conversion processing finds the interim luminance values (Lr, Lg, and Lb) of each primary color (RGB). This calculation processing is one example of the interim luminance value calculation processing.

The following formula (F2) shows a series of processing of the step S1 and this step S2.

$$\begin{aligned}
&X\min = \text{Min}(Xr, Xg, Xb) \\
&\text{If } X\min \geq S\min \\
&\text{Then } Xr' = Xr, Xg' = Xg, Xb' = Xb, c = m = y = 0 \\
&\text{Else IF } Xr = X\min \\
&\text{Then } Xr' = S\min, Xg' = Xg, Xb' = Xb, c = S\min - Xr, \\
&m = y = 0 \\
&\text{Else IF } Xg = X\min \\
&\text{Then } Xr' = Xr, Xg' = S\min, Xb' = Xb, \\
&m = S\min - Xg, c = y = 0 \\
&\text{Else IF } Xb = X\min \\
&\text{Then } Xr' = Xr, Xg' = Xg, Xb' = S\min, y = S\min - Xb, \\
&c = m = 0 \\
&L1r = Xr' + k \cdot y + k \cdot m \\
&L1g = Xg' + k \cdot c + k \cdot y \\
&L1b = Xb' + k \cdot m + k \cdot c \\
&L1\min = \text{Min}(L1r, L1g, L1b) \\
&\text{If } L1\min \geq S\min \\
&\text{Then } L1r' = L1r, L1g' = L1g, L1b' = L1b, \\
&c1 = m1 = y1 = 0 \\
&\text{Else IF } L1r = L1\min \\
&\text{Then } L1r' = S\min, L1g' = L1g, L1b' = L1b, \\
&c1 = S\min - L1r, m1 = y1 = 0 \\
&\text{Else IF } L1g = L1\min \\
&\text{Then } L1r' = L1r, L1g' = S\min, L1b' = L1b, \\
&m1 = S\min - L1g, c1 = y1 = 0 \\
&\text{Else IF } L1b = L1\min \\
&\text{Then } L1r' = L1r, L1g' = L1g, L1b' = S\min, \\
&y1 = S\min - L1b, c1 = m1 = 0 \\
&Lr = L1r' + k \cdot y1 + k \cdot m1 \\
&Lg = L1g' + k \cdot c1 + k \cdot y1 \\
&Lb = L1b' + k \cdot m1 + k \cdot c1
\end{aligned} \quad (F2)$$

In the formula (F2),
Smin=output lower limit value (a lower limit value of each luminance signal in a secondary video signal)
Xr=a value of R luminance signal in a primary video signal
Xg=a value of G luminance signal in a primary video signal
Xb=a value of B luminance signal in a primary video signal
c, c1, m, m1, y, y1, Xr', Xg', Xb'=variable
L1r, L1r', L1g, L1g', L1b, L1b', Xmin, L1min=variable
k=invariable (however, o<k)
Lr=R interim luminance value
Lg=G interim luminance value
Lb=B interim luminance value In addition, L1r, L1g, and L1b in the formula (F2) correspond to Lr, Lg, and Lb in the formula (F1).

In what follows, one example of calculation processing of the interim luminance values (Lr, Lg, and Lb) of each primary color (RGB) based on the formula (2) is described.

For example, when the minimum value L1min among the first complementary color conversed signal values L1r, L1g, and Lb of each primary color (RGB) obtained by the first complementary color conversion processing is a red signal value L1r, the calculation result of the interim luminance values (Lr, Lg, and Lb) of each primary colors (RGB) based on the formula (F2) is as follows.

In this case, the output lower limit value Smin is set for the red interim luminance value Lr same as the color of the first complementary color conversed signal's minimum value L1min.

Furthermore, the signal values, which is what a positive complementary value {k×c1 (however, c1=Smin−L1r)} proportional to the difference between the output lower limit value Smin and the red first complementary color conversed signal's minimum value L1r (=L1min) is added to the first complementary color conversed signal value L1g and L1b of two colors other than the first complementary color conversed signal's minimum value L1r, are set to interim luminance values Lg and Lb of each of the rest of other two colors G and B.

The above is no different even when a magnitude relationship between a signal value of each color is different.

When the interim luminance values (Lr, Lg, and Lb) of each primary color (RGB) obtained by the processing in the step S2 do not include a value less than the output lower limit value Smin, production processing of the secondary video signal based on the aforementioned interim luminance values (Lr, Lg, and Lb) of each primary color (RGB) is executed. In short, a processing according to circumstances, whether or not the interim luminance values (Lr, Lg, and Lb) of each primary color (RGB) include a value greater than the output upper limit value Smax, is executed.

[Step S3]

On the other hand, after the first complementary color conversion processing (S1) and the second complementary color conversion processing (S2), when the minimum value L2min among signal values L21, L22, and L23 of each primary color (RGB) obtained by these processing is less than the output lower limit value Smin, the signal range adjusting member 3 executes a third complementary color conversion processing as described below. Hereinafter, the signal values L21, L22, and L23 are called second complementary color conversed signal values, and the minimum value L2min among them is called a second complementary color conversed signal's minimum value.

The third complementary color conversion processing sets the output lower limit value Smin for a signal value of the color having the second complementary color conversed signal's minimum value L2min, and at the same time, setting a value to signal values of other two colors, said value obtained by adding a positive complementary value {k×(Smin−L2min)} proportional to the difference between the output lower limit value Smin and the second complementary color conversed signal's minimum value L2min to the signal values of two color other than the second complementary color conversed signal's minimum value L2min among the second complementary color conversed signal values L21, L22, and L23 obtained by the second complementary color conversion processing (S2). This execution of the third complementary color conversion processing finds the interim luminance values (Lr, Lg, and Lb) of each primary color (RGB). This calculation processing is one example of the interim luminance value calculation processing.

The following formula (F3) shows a series of processing of the steps S1, S2, and this S3.

$$\left.\begin{aligned}
&X\min = \text{Min}(Xr, Xg, Xb)\\
&\text{If } X\min \geq S\min\\
&\text{Then } Xr' = Xr, Xg' = Xg, Xb' = Xb, c = m = y = 0\\
&\text{Else IF } Xr = X\min\\
&\text{Then } Xr' = S\min, Xg' = Xg, Xb' = Xb, c = S\min - Xr,\\
&m = y = 0\\
&\text{Else IF } Xg = X\min\\
&\text{Then } Xr' = Xr, Xg' = S\min, Xb' = Xb, m = S\min - Xg,\\
&c = y = 0\\
&\text{Else IF } Xb = X\min\\
&\text{Then } Xr' = Xr, Xg' = Xg, Xb' = S\min, y = S\min - Xb,\\
&c = m = 0\\
&L1r = Xr' + k \cdot y + k \cdot m\\
&L1g = Xg' + k \cdot c + k \cdot y\\
&L1b = Xb' + k \cdot m + k \cdot c\\
&L1\min = \text{Min}(L1r, L1g, L1b)\\
&\text{If } L1\min \geq S\min\\
&\text{Then } L1r' = L1r, L1g' = L1g, L1b' = L1b,\\
&c1 = m1 = y1 = 0\\
&\text{Else IF } L1r = L1\min\\
&\text{Then } L1r' = S\min, L1g' = L1g, L1b' = L1b,\\
&c1 = S\min - L1r, m1 = y1 = 0\\
&\text{Else IF } L1g = L1\min\\
&\text{Then } L1r' = L1r, L1g' = S\min, L1b' = L1b,\\
&m1 = S\min - L1g, c1 = y1 = 0\\
&\text{Else IF } L1b = L1\min\\
&\text{Then } L1r' = L1r, L1g' = L1g, L1b' = S\min,\\
&y1 = S\min - L1b, c1 = m1 = 0\\
&L2r = L1r' + k \cdot y1 + k \cdot m1\\
&L2g = L1g' + k \cdot c1 + k \cdot y1\\
&L2b = L1b' + k \cdot m1 + k \cdot c1\\
&L2\min = \text{Min}(L2r, L2g, L2b)\\
&\text{If } L2\min \geq S\min\\
&\text{Then } L2r' = L2r, L2g' = L2g, L2b' = L2b,\\
&c2 = m2 = y2 = 0\\
&\text{Else IF } L2r = L2\min\\
&\text{Then } L2r' = S\min, L2g' = L2g, L2b' = L2b,\\
&c2 = S\min - L2r, m2 = y2 = 0\\
&\text{Else IF } L2g = L2\min\\
&\text{Then } L2r' = L2r, L2g' = S\min, L2b' = L2b,\\
&m2 = S\min - L2g, c2 = y2 = 0\\
&\text{Else IF } L2b = L2\min\\
&\text{Then } L2r' = L2r, L2g' = L2g, L2b' = S\min,\\
&y2 = S\min - L2b, c2 = m2 = 0\\
&Lr = L2r' + k \cdot y2 + k \cdot m2\\
&Lg = L2g' + k \cdot c2 + k \cdot y2\\
&Lb = L2b' + k \cdot m2 + k \cdot c2
\end{aligned}\right\} \quad (F3)$$

In the formula (F3),

Smin=output lower limit value (a lower limit value of each luminance signal in a secondary video signal)
Xr=a value of R luminance signal in a primary video signal
Xg=a value of G luminance signal in a primary video signal
Xb=a value of B luminance signal in a primary video signal
c, c1, m, m1, y, y1, Xr', Xg', Xb'=variable
L1r, L1r', L1g, L1g', L1b, L1b', Xmin, L1min=variable
L2r, L2r', L2g, L2g', L2b, L2b', L2min=variable
k=invariable (however, o<k)

Lr=R interim luminance value
Lg=G interim luminance value
Lb=B interim luminance value In addition, L1r, L1g, and L1b in the formula (F3) correspond to Lr, Lg, and Lb in the formula (F1), while L2r, L2g, and L2b in the formula (F3) correspond to Lr, Lg, and Lb in the formula (F2).

In what follows, one example of calculation processing of the interim luminance values (Lr, Lg, and Lb) of each primary color (RGB) based on the formula (F3) is described.

For example, when the minimum value L2min among the second complementary color conversed signal values L2r, L2g, and L2b of each primary color (RGB) obtained by the second complementary color conversion processing is an blue signal value L1b, the calculation result of the interim luminance values (Lr, Lg, and Lb) of each primary color (RGB) based on the formula (F3) is as follows.

In this case, the output lower limit value Smin is set for the blue interim luminance value Lb same as the color of the second complementary color conversed signal's minimum value L2min.

Furthermore, the signal values, obtained by adding complementary value {k×y2 (however, y2=Smin−L2b)} proportional to the difference between the output lower limit value Smin and the blue second complementary color conversed signal's minimum value L2b (=L2min) to the second complementary color conversed signal value L2g and L2b of two colors other than the second complementary color conversed signal's minimum value L2r, are set for interim luminance values Lr and Lg of each of the rest of other two colors R and G.

The above is no different even when a magnitude relationship between a signal value of each color is different.

Since the interim luminance values (Lr, Lg, and Lb) of each primary color (RGB) obtained by the processing in the step S3 do not include a value less than the output lower limit value Smin, production processing of the secondary video signal based on the aforementioned interim luminance values (Lr, Lg, and Lb) of each primary color (RGB) is executed. In short, a processing according to circumstances, whether or not the interim luminance values (Lr, Lg, and Lb) of each primary color (RGB) include a value greater than the output upper limit value Smax, is executed.

Additionally, the following formulas (F1'), (F2') and (F3') are respectively corresponding to the formulas (F1), (F2), and (F3) when the output range is 0 to 1 (Smin=0 and Smax=1), and when each signal value (Xr, Xg, and Xb) in the primary video signal is normalized in accordance with the aforementioned output range 0 to 1.

$$\left.\begin{aligned}
&X\min = \text{Min}(Xr, Xg, Xb)\\
&\text{If } X\min \geq 0\\
&\text{Then } Xr' = Xr, Xg' = Xg, Xb' = Xb, c = m = y = 0\\
&\text{Else IF } Xr = X\min\\
&\text{Then } Xr' = 0, Xg' = Xg, Xb' = Xb, c = -Xr, m = y = 0\\
&\text{Else IF } Xg = X\min\\
&\text{Then } Xr' = Xr, Xg' = 0, Xb' = Xb, m = -Xg, c = y = 0\\
&\text{Else IF } Xb = X\min\\
&\text{Then } Xr' = Xr, Xg' = Xg, Xb' = 0, y = -Xb, c = m = 0\\
&Lr = Xr' + k \cdot y + k \cdot m\\
&Lg = Xg' + k \cdot c + k \cdot y\\
&Lb = Xb' + k \cdot m + k \cdot c
\end{aligned}\right\} \quad (F1')$$

In the formula (F1'),
Xr=a value of R luminance signal in a primary video signal
Xg=a value of G luminance signal in a primary video signal
Xb=a value of B luminance signal in a primary video signal
c, c1, m, m1, y, y1, Xr', Xg', Xb'=variable
L1r, L1r', L1g, L1g', L1b, L1b', Xmin, L1min=variable
k=invariable (however, o<k)
Lr=R interim luminance value
Lg=G interim luminance value
Lb=B interim luminance value $$\left.\begin{array}{l}X\min = \text{Min}(Xr, Xg, Xb) \\ \text{If } X\min \geq 0 \\ \text{Then } Xr' = Xr, Xg' = Xg, Xb' = Xb, c = m = y = 0 \\ \text{Else IF } Xr = X\min \\ \text{Then } Xr' = 0, Xg' = Xg, Xb' = Xb, c = -Xr, m = y = 0 \\ \text{Else IF } Xg = X\min \\ \text{Then } Xr' = Xr, Xg' = 0, Xb' = Xb, m = -Xg, c = y = 0 \\ \text{Else IF } Xb = X\min \\ \text{Then } Xr' = Xr, Xg' = Xg, Xb' = 0, y = -Xb, c = m = 0 \\ L1r = Xr' + k \cdot y + k \cdot m \\ L1g = Xg' + k \cdot c + k \cdot y \\ L1b = Xb' + k \cdot m + k \cdot c \\ L1\min = \text{Min}(L1r, L1g, L1b) \\ \text{If } L1\min \geq 0 \\ \text{Then } L1r' = L1r, L1g' = L1g, L1b' = L1b, \\ c1 = m1 = y1 = 0 \\ \text{Else IF } L1r = L1\min \\ \text{Then } L1r' = 0, L1g' = L1g, L1b' = L1b, c1 = -L1r, \\ m1 = y1 = 0 \\ \text{Else IF } L1g = L1\min \\ \text{Then } L1r' = L1r, L1g' = 0, L1b' = L1b, m1 = -L1g, \\ c1 = y1 = 0 \\ \text{Else IF } L1b = L1\min \\ \text{Then } L1r' = L1r, L1g' = L1g, L1b' = 0, y1 = -L1b, \\ c1 = m1 = 0 \\ Lr = L1r' + k \cdot y1 + k \cdot m1 \\ Lg = L1g' + k \cdot c1 + k \cdot y1 \\ Lb = L1b' + k \cdot m1 + k \cdot c1\end{array}\right\} \quad (F2')$$

In the formula (F2'),
Xr=a value of R luminance signal in a primary video signal
Xg=a value of G luminance signal in a primary video signal
Xb=a value of B luminance signal in a primary video signal
c, c1, m, m1, y, y1, Xr', Xg', Xb'=variable
L1r, L1r', L1g, L1g', L1b, L1b', Xmin, L1min=variable
k=invariable (however, o<k)
Lr=R interim luminance value
Lg=G interim luminance value
Lb=B interim luminance value $$\left.\begin{array}{l}X\min = \text{Min}(Xr, Xg, Xb) \\ \text{If } X\min \geq 0 \\ \text{Then } Xr' = Xr, Xg' = Xg, Xb' = Xb, c = m = y = 0 \\ \text{Else IF } Xr = X\min \\ \text{Then } Xr' = 0, Xg' = Xg, Xb' = Xb, c = -Xr, m = y = 0 \\ \text{Else IF } Xg = X\min \\ \text{Then } Xr' = Xr, Xg' = 0, Xb' = Xb, m = -Xg, c = y = 0 \\ \text{Else IF } Xb = X\min \\ \text{Then } Xr' = Xr, Xg' = Xg, Xb' = 0, y = -Xb, c = m = 0 \\ L1r = Xr' + k \cdot y + k \cdot m \\ L1g = Xg' + k \cdot c + k \cdot y \\ L1b = Xb' + k \cdot m + k \cdot c \\ L1\min = \text{Min}(L1r, L1g, L1b) \\ \text{If } L1\min \geq 0 \\ \text{Then } L1r' = L1r, L1g' = L1g, L1b' = L1b, \\ c1 = m1 = y1 = 0 \\ \text{Else IF } L1r = L1\min \\ \text{Then } L1r' = 0, L1g' = L1g, L1b' = L1b, c1 = -L1r, \\ m1 = y1 = 0 \\ \text{Else IF } L1g = L1\min \\ \text{Then } L1r' = L1r, L1g' = 0, L1b' = L1b, m1 = -L1g, \\ c1 = y1 = 0 \\ \text{Else IF } L1b = L1\min \\ \text{Then } L1r' = L1r, L1g' = L1g, L1b' = 0, y1 = -L1b, \\ c1 = m1 = 0 \\ L2r = L1r' + k \cdot y1 + k \cdot m1 \\ L2g = L1g' + k \cdot c1 + k \cdot y1 \\ L2b = L1b' + k \cdot m1 + k \cdot c1 \\ L1\min = \text{Min}(L2r, L2g, L2b) \\ \text{If } L2\min \geq 0 \\ \text{Then } L2r' = L2r, L2g' = L2g, L2b' = L2b, \\ c2 = m2 = y2 = 0 \\ \text{Else IF } L2r = L2\min \\ \text{Then } L2r' = 0, L2g' = L2g, L2b' = L2b, c2 = -L2r, \\ m2 = y2 = 0 \\ \text{Else IF } L2g = L2\min \\ \text{Then } L2r' = L2r, L2g' = 0, L2b' = L2b, m2 = -L2g, \\ c2 = y2 = 0 \\ \text{Else IF } L2b = L2\min \\ \text{Then } L2r' = L2r, L2g' = L2g, L2b' = 0, y2 = -L2b, \\ c2 = m2 = 0 \\ Lr = L2r' + k \cdot y2 + k \cdot m2 \\ Lg = L2g' + k \cdot c2 + k \cdot y2 \\ Lb = L2b' + k \cdot m2 + k \cdot c2\end{array}\right\} \quad (F3')$$

In the formula (F3'),
Xr=a value of R luminance signal in a primary video signal
Xg=a value of G luminance signal in a primary video signal
Xb=a value of B luminance signal in a primary video signal
c, c1, m, m1, y, y1, Xr', Xg', Xb'=variable
L1r, L1r', L1g, L1g', L1b, L1b', Xmin, L1min=variable
L2r, L2r', L2g, L2g', L2b, L2b', L2min=variable
k=invariable (however, o<k)
Lr=R interim luminance value
Lg=G interim luminance value
Lb=B interim luminance value According to the above-mentioned processing, the interim luminance values of each primary color (RGB) are prevented from enlarging beyond necessity. As a result, a change (increase) in luminance (brightness) of a video caused by the signal conversion from the primary video signal to the secondary video signal can be restrained to the minimum.

Additionally, in a state where the video signal converter Q conducts the processing in the step S3, the same processing signal as that based on the formulas (A1) or (A1') and (A2) can be obtained.

In addition, when the first complementary color conversed signal values L11, L12, and L13 obtained by the first complementary color conversion processing (S1) include a value less than the output lower limit value Smin, a clip processing for replacing the value with the output lower limit value Smin may be performed to conduct production processing of the secondary video signal. In such case, the second complementary color conversion processing (S2) and the third complementary color conversion processing (S3) are not conducted.

Similarly, when the second complementary color conversed signal values L21, L22, and L23 obtained by the second complementary color conversion processing (S2) include a value less than the output lower limit value Smin, a clip processing for replacing the value with the output lower limit value Smin may be performed to conduct production processing of the secondary video signal. In such case, the third complementary color conversion processing (S3) is not conducted.

The present invention is applicable to a signal converter and a video display device comprising thereof for converting a primary side video signal into a secondary side video signal so that its signal value can be within a prescribed range.

What is claimed is:

1. A video signal converter for converting a primary video signal composed of luminance signals of each primary color (RGB) that may obtain a signal value within an extended range partially including an output range from a predetermined output lower limit value to an output upper limit value, into a secondary video signal, as a video signal to be input into a prescribed video display means, and composed of luminance signals of each primary color (RGB) that may obtain a value in the output range, comprising:
an interim luminance value calculating means for calculating interim luminance values of each primary color (RGB), by conducting a first complementary color conversion processing for setting the output lower limit value to a signal value of a primary color having a primary signal minimum value when the primary signal minimum value as a minimum value among the luminance signal values of each primary color (RGB) in the primary video signal is less than the output lower limit value, and at the same time, for setting a value obtained by adding a positive complementary value proportional to a difference between the output lower limit value and the primary signal minimum value to signal values of two primary colors other than the primary signal minimum value in the primary video signal, and
a secondary video signal producing means for producing the secondary video signal composed of signals having values obtained by converting the interim luminance values of each of the primary colors (RGB) into values within the output range in accordance with a predetermined conversion rule, when the interim luminance values of each primary color (RGB) include a value greater than the output upper limit value; and the secondary video signal composed of signals of the interim luminance values of each primary color (RGB), when the interim luminance values of each primary color (RGB) do not include a value greater than the output upper limit value.

2. The video signal converter according to claim 1, wherein the interim luminance value calculating means calculates the interim luminance values of each of the primary colors (RGB) by conducting, in addition to the first complementary color conversion processing, a second complementary color conversion processing for setting the output lower limit value to a signal value of a primary color having a first complementary color conversed signal's minimum value, when the first complementary color conversed signal's minimum value as a minimum value among the first complementary color conversed signal values as signal values of each primary color (RGB) that can be obtained by the first complementary color conversion processing is less than the output lower limit value, and at the same time, for setting a value obtained by adding a positive complementary value proportional to a difference between the output lower limit value and the first after-complementary color conversion minimum signal value to signal values of two primary colors other than the first complementary color conversed signal's minimum value in the first complementary color conversed signal values.

3. The video signal converter according to claim 2, wherein the interim luminance value calculating means calculates the interim luminance values of each of the primary colors (RGB) by conducting, in addition to the first complementary color conversion processing and the second complementary color conversion processing, a third complementary color conversion processing for setting the output lower limit value to a signal value of a primary color having a second complementary color conversed signal's minimum value, when the second complementary color conversed signal's minimum value as a minimum value among second complementary color conversed signal values as signal values of each primary color (RGB) that can be obtained by the second complementary color conversion processing is less than the output lower limit value, and at the same time, for setting a value obtained by adding a positive complementary value proportional to a difference between the output lower limit value and the second after-complementary color conversion minimum signal value to signal values of two primary colors other than the second complementary color conversed signal's minimum value in the second complementary color conversed signal values.

4. A video signal converter for converting a primary video signal composed of luminance signals of each primary color (RGB) that may obtain a signal value in an extended range partially including an output range from a predetermined output lower limit value to an output upper limit value, into a secondary video signal, as a video signal to be input into a prescribed video display means, composed of luminance signals of each primary color (RGB) that may obtain a value in the output range, comprising: an interim luminance value calculating means for calculating that calculates interim luminance values of each primary color (RGB) that can be obtained by applying values of luminance signals of each primary color (RGB) in the primary video signal to the following formulas (A1) and (A2), and $$\begin{aligned} &\text{If } Xr < S\text{min} \quad \text{Then } c = S\text{min} - Xr, \quad Xr' = S\text{min} \quad \text{Else } c = 0, \quad Xr' = Xr \\ &\text{If } Xg < S\text{min} \quad \text{Then } m = S\text{min} - Xg, \quad Xg' = S\text{min} \quad \text{Else } m = 0, \quad Xg' = Xg \\ &\text{If } Xb < S\text{min} \quad \text{Then } y = S\text{min} - Xb, \quad Xb' = S\text{min} \quad \text{Else } y = 0, \quad Xb' = Xb \end{aligned} \quad (A1)$$

$$Lr = Xr' + k \cdot y + k \cdot m$$
$$Lg = Xg' + k \cdot c + k \cdot y \quad (A2)$$
$$Lb = Xb' + k \cdot m + k \cdot c$$

In the formulas (A1) and (A2),
Smin=output lower limit value (a lower limit value of each luminance signal in the secondary video signal)
Xr=a value of R luminance signal in a primary video signal
Xg=a value of G luminance signal in a primary video signal
Xb=a value of B luminance signal in a primary video signal
c, m, y, Xr', Xg', Xb'=variable
k=invariable (however, o<k)
Lr=R interim luminance value
Lg=G interim luminance value
Lb=B interim luminance value
a secondary video signal producing means for producing the secondary video signal composed of signals having values obtained by converting the interim luminance values of each of the primary colors (RGB) into values within the output range in accordance with a predetermined conversion rule, when the interim luminance values of each primary color (RGB) include a value greater than the output upper limit value; and the secondary video signal composed of signals of the interim luminance values of each primary color (RGB), when the interim luminance values of each primary color (RGB) do not include a value greater than the output upper limit value.

5. The video signal converter according to claim 4, wherein an invariable k is 1 in the formula (A2).

6. The video signal converter according to any of claims 1 or 4, wherein the predetermined conversion rule in the secondary video signal producing means is to replace the largest value in the interim luminance values with the output upper limit value, while at the same time, to compress the other interim luminance values based on a compression coefficient determined in accordance with the magnitude of the largest value in the interim luminance values.

7. The video signal converter according to any of claims 1 or 4, wherein the predetermined conversion rule in the secondary video signal producing means is to compress all the interim luminance values of each primary color (RGB) in accordance with the ratio between the width of the range from the output lower limit value to the largest value in the interim luminance values of each primary color (RGB) and the width of the output range.

8. The video signal converter according to any of claims 1 or 4, wherein the primary video signal is a video signal complying to the standard IEC 61966-2-4 or IEC 61966-2-1 or the video signal subjected to gamma processing.

9. The video signal converter according to any of claims 1 or 4, wherein the secondary video signal or a signal obtained by subjecting the secondary video signal to gamma processing is a video signal complying to the standard ITU-R BT.709 or ITU-R BT.601-5.

10. A video signal converter for converting a primary video signal composed of luminance signals of each primary color (RGB) that may obtain a signal value in an extended range as a range of normalized value from a negative value to a value greater than 1 into a secondary video signal which is a video signal to be input into a prescribed video display means and is composed of luminance signals of each primary color (RGB) that may obtain a value in an output range as a normalized value from 0 to 1, comprising:

an interim luminance value calculating means for calculating interim luminance values of each primary color (RGB) that can be obtained by applying values of luminance signals of each primary color (RGB) in the primary video signal to the following formulas (A1') and (A2), and If $Xr < 0$ Then $c = 0 - Xr$, $Xr' = 0$ Else $c = 0$, $Xr' = Xr$
If $Xg < 0$ Then $m = 0 - Xg$, $Xg' = 0$ Else $m = 0$, $Xg' = Xg$ (A1')
If $Xb < 0$ Then $y = 0 - Xb$, $Xb' = 0$ Else $y = 0$, $Xb' = Xb$ $$Lr = Xr' + k \cdot y + k \cdot m$$
$$Lg = Xg' + k \cdot c + k \cdot y \quad (A2)$$
$$Lb = Xb' + k \cdot m + k \cdot c$$

In the formulas (A1') and (A2),
Xr=a value of R luminance signal in a primary video signal
Xg=a value of G luminance signal in a primary video signal
Xb=a value of B luminance signal in a primary video signal
c, m, y, Xr', Xg', Xb'=variable
k=invariable (however, o<k)
Lr=R interim luminance value
Lg=G interim luminance value
Lb=B interim luminance value
a secondary video signal producing means for producing the secondary video signal composed of signals having values obtained by converting the interim luminance values of each of the primary colors (RGB) into values within the output range in accordance with a predetermined conversion rule, when the interim luminance values of each primary color (RGB) include a value greater than 1; and the secondary video signal composed of signals of the interim luminance values of each primary color (RGB), when the interim luminance values of each primary color (RGB) do not include a value greater than 1.

11. A video display device comprising a video signal converter according to any of claims 1, 4 or 10 and a video display means for displaying a video based on the secondary video signal produced by the video signal converter.

12. A video signal converting method for converting a primary video signal composed of luminance signals of each primary color (RGB) that may obtain signal values in an extended range partially including an output range from a predetermined output lower limit value to an output upper limit value, into a secondary video signal, as a video signal to be input into a prescribed video display means, composed of luminance signals of each primary color (RGB) that may obtain values in the output range, which conducts,
by means of a prescribed processor,
an interim luminance value calculation processing for calculating the interim luminance values of each primary color (RGB), by conducting a first complementary color conversion processing for replacing the primary signal minimum value with the output lower limit value when the primary signal minimum value as a minimum value among luminance signal values of each primary color (RGB) in the primary video signal is less than the output lower limit value, and at the same time, adding a positive complementary value proportional to a difference between the output lower limit value and the primary signal minimum value to signal values of two primary colors other than the primary signal minimum value in the primary video signal, and a secondary video signal production processing for producing: the secondary video signal composed of signals having values obtained by converting interim luminance values of each of the primary colors (RGB) into values within the output range in accordance with a predetermined conversion rule, when the interim luminance values of each primary color (RGB) include a value greater than the output upper limit value; and the secondary video signal composed of signals of the interim luminance values of each primary color (RGB), when the interim luminance values of each primary color (RGB) do not include a value greater than the output upper limit value.

13. The video signal converting method according to claim 12, wherein the interim luminance values of each of the primary colors (RGB) are calculated in the interim luminance value calculation processing by conducting, in addition to the first complementary color conversion processing, a second complementary color conversion processing for replacing a first complementary color conversed signal's minimum value with the output lower limit value, when the first complementary color conversed signal's minimum value as a minimum value among first complementary color conversed signal values obtained by correcting signal values of the rest of two primary colors that can be obtained by the first complementary color conversion processing is less than the output lower limit value, and at the same time, adding a positive complementary value proportional to a difference between the output lower limit value and the first after-complementary color conversion minimum signal value to signal values of the rest of two colors other than the first complementary color conversed signal's minimum value in the first complementary color conversed signal values.

14. The video signal converting method according to claim 13, wherein the interim luminance values of each of the primary colors (RGB) are calculated in the interim luminance value calculation processing by conducting, in addition to the first complementary color conversion processing and the second complementary color conversion processing, a third complementary color conversion processing for replacing a second complementary color conversed signal's minimum value with the output lower limit value, when the second complementary color conversed signal's minimum value as a minimum value among second complementary color conversed signal values obtained by correcting signal values of the rest of two primary colors that can be obtained by the second complementary color conversion processing is less than the output lower limit value, and at the same time, adding a positive complementary value proportional to a difference between the output lower limit value and the second after-complementary color conversion minimum signal value to signal values of the rest of two primary colors other than the second complementary color conversed signal's minimum value in the second complementary color conversed signal values.

15. A video signal converting method for converting and outputting a primary video signal composed of luminance signals of each primary color (RGB) that may obtain signal values in an extended range partially including an output range from a predetermined output lower limit value to an output upper limit value, into a secondary video signal, as a video signal to be input into a prescribed video display means, composed of luminance signals of each primary color (RGB) that may obtain values in the output range, which conducts, by means of a prescribed processor, an interim luminance value calculation processing for calculating and recording into a recording means interim luminance values of each primary color (RGB) that can be obtained by applying values of luminance signals of each primary color (RGB) in the primary video signal to the following formulas (A1) and (A2), and $$\left.\begin{array}{l} \text{If } Xr < S\min \quad \text{Then } c = S\min - Xr, \quad Xr' = S\min \quad \text{Else } c = 0, \quad Xr' = Xr \\ \text{If } Xg < S\min \quad \text{Then } m = S\min - Xg, \quad Xg' = S\min \quad \text{Else } m = 0, \quad Xg' = Xg \\ \text{If } Xb < S\min \quad \text{Then } y = S\min - Xb, \quad Xb' = S\min \quad \text{Else } y = 0, \quad Xb' = Xb \end{array}\right\} \quad (A1)$$

$$\left.\begin{array}{l} Lr = Xr' + k \cdot y + k \cdot m \\ Lg = Xg' + k \cdot c + k \cdot y \\ Lb = Xb' + k \cdot m + k \cdot c \end{array}\right\} \quad (A2)$$

In the formulas (A1) and (A2),

Smin=output lower limit value (a lower limit value of each luminance signal in the secondary video signal)

Xr=a value of R luminance signal in a primary video signal

Xg=a value of G luminance signal in a primary video signal

Xb=a value of B luminance signal in a primary video signal c, m, y, Xr', Xg', Xb'=variable k=invariable (however, o<k)

Lr=R interim luminance value

Lg=G interim luminance value

Lb=B interim luminance value a secondary video signal production processing for producing and outputting: the secondary video signal composed of signals having values obtained by converting the interim luminance values of each of the primary colors (RGB) into values within the output range in accordance with a predetermined conversion rule, when the interim luminance values of each primary color (RGB) include a value greater than the output upper limit value; and the secondary video signal composed of signals of the interim luminance values of each primary color (RGB), when the interim luminance values of each primary color (RGB) do not include a value greater than the output upper limit value.

16. A video signal converting method for converting and outputting a primary video signal composed of luminance signals of each primary color (RGB) that may obtain signal values in an extended range as a range of normalized value from a negative value to a value greater than 1 into a secondary video signal as a video signal to be input into a prescribed video display means, composed of luminance signals of each primary color (RGB) that may obtain values in an output range as a normalized value from 0 to 1, which conducts, by means of a prescribed processor, an interim luminance value calculation processing for calculating and recording into a recording means interim luminance values of each primary color (RGB) that can be obtained by applying values of luminance signals of each primary color (RGB) in the primary video signal to the following formulas (A1') and (A2), and $$\left.\begin{aligned}&\text{If } Xr<0 \quad \text{Then } c=-Xr, \quad Xr'=0 \quad \text{Else } c=0, \quad Xr'=Xr\\&\text{If } Xg<0 \quad \text{Then } m=-Xg, \quad Xg'=0 \quad \text{Else } m=0, \quad Xg'=Xg\\&\text{If } Xb<0 \quad \text{Then } y=-Xb, \quad Xb'=0 \quad \text{Else } y=0, \quad Xb'=Xb\end{aligned}\right\} \quad (A1')$$

$$\left.\begin{aligned}Lr &= Xr' + k\cdot y + k\cdot m\\Lg &= Xg' + k\cdot c + k\cdot y\\Lb &= Xb' + k\cdot m + k\cdot c\end{aligned}\right\} \quad (A2)$$

In the formulas (A1') and (A2),
Xr=a value of R luminance signal in a primary video signal
Xg=a value of G luminance signal in a primary video signal
Xb=a value of B luminance signal in a primary video signal
c, m, y, Xr', Xg', Xb'=variable
k=invariable (however, o<k)
Lr=R interim luminance value
Lg=G interim luminance value
Lb=B interim luminance value
a secondary video signal production processing for producing and outputting: the secondary video signal composed of signals having values obtained by converting the interim luminance values of each of the primary colors (RGB) into values within the output range in accordance with a predetermined conversion rule, when the interim luminance values of each primary color (RGB) include a value greater than 1; and the secondary video signal composed of signals of the interim luminance values of each primary color (RGB), when the interim luminance values of each primary color (RGB) do not include a value greater than 1.

* * * * *